(12) United States Patent
Butler et al.

(10) Patent No.: US 6,201,853 B1
(45) Date of Patent: Mar. 13, 2001

(54) TELEPHONE TECHNICIAN'S REMOTE ASSIST APPARATUS AND METHOD

(75) Inventors: Myron C. Butler, Edmond; Carl P. Bright, Harrah, both of OK (US); Lawrence O. Hilligoss, Ashland, OR (US)

(73) Assignee: Communications Manufacturing Company, Los Angeles, CA (US)

( * ) Notice: Subject to any disclaimer, the term of this patent is extended or adjusted under 35 U.S.C. 154(b) by 0 days.

(21) Appl. No.: 09/351,694

(22) Filed: Jul. 13, 1999

(51) Int. Cl.$^7$ .................................................. H04M 1/24

(52) U.S. Cl. ................................ 379/21; 379/22; 379/26; 379/29

(58) Field of Search .................................. 379/1, 2, 5–6, 379/7, 10, 12, 15–17, 21–22, 25, 27, 29, 31–34, 26; 324/512, 529, 531, 539

(56) References Cited

U.S. PATENT DOCUMENTS

| | | | |
|---|---|---|---|
| Re. 33,281 | 7/1990 | Ray et al. | 379/25 |
| 3,699,274 | 10/1972 | Bennett | 179/175 |
| 3,902,026 | 8/1975 | Rogers et al. | 179/175.3 A |
| 4,127,748 | 11/1978 | Gillemot | 179/98 |
| 4,418,250 | 11/1983 | Hilligoss | 179/175.3 R |
| 4,520,234 | 5/1985 | Fields et al. | 179/2 A |
| 4,523,061 | 6/1985 | Dagan et al. | 200/17 R |
| 4,524,321 | 6/1985 | Jablway et al. | 324/66 |
| 4,536,703 | 8/1985 | Jablway et al. | 324/52 |
| 4,538,033 | 8/1985 | Bruce et al. | 179/175 |
| 4,590,336 | 5/1986 | Ray et al. | 179/175.3 A |
| 4,609,789 | 9/1986 | Ray et al. | 179/175.2 D |
| 4,639,557 | 1/1987 | Butler et al. | 379/29 |
| 4,661,969 | 4/1987 | Butler et al. | 379/1 |
| 4,663,776 | 5/1987 | Wever et al. | 379/29 |
| 4,706,271 | 11/1987 | Hilligoss et al. | 379/49 |
| 4,841,560 | 6/1989 | Chan et al. | 379/29 |
| 4,843,620 | 6/1989 | Hagedorn | 379/21 |
| 4,864,597 | 9/1989 | Fore | 379/6 |
| 4,912,755 | 3/1990 | Blood et al. | 379/6 |
| 4,937,851 | * 6/1990 | Lynch et al. | 379/6 |
| 5,195,124 | * 3/1993 | Ishioka | 379/27 |
| 5,457,729 | * 10/1995 | Hamann et al. | 379/2 |
| 5,521,959 | * 5/1996 | Walsworth et al. | 379/27 |
| 5,528,662 | 6/1996 | Stephens | 379/29 |
| 5,559,854 | * 9/1996 | Suzuki | 379/27 |
| 5,768,341 | * 6/1998 | Pryor et al. | 379/22 |
| 5,802,143 | * 9/1998 | Borchering et al. | 379/32 |

OTHER PUBLICATIONS

Publication entitled "SmartStrap® Cable Test/Remote Strapping Device," (4 pp.) Communications Technology Corporation, Madison, Alabama (Jan. 1998).

"Do you Have More Trouble Calls Than You Can Handle? Hire Yourself An AM440 Remote Test Printer," Ameritec Corporation. (Admitted prior art).

* cited by examiner

Primary Examiner—Stella Woo
Assistant Examiner—Binh K. Tieu
(74) Attorney, Agent, or Firm—McAfee & Taft

(57) ABSTRACT

A telephone technician's remote assist apparatus connects into a telephone line to be tested by the technician from a remote location. Control signals are sent from the remote location to the remote assist apparatus over the same pair of wires of the telephone line under test. A particular control signal encoding includes two consecutive leading star (**) dual-tone multi-frequency tones. The remote assist apparatus opens the telephone line in response to at least one control signal, and the apparatus preferably automatically restores the line after a predetermined time so that the subscriber is not left disconnected. The particular control signal encoding and the automatic restoring features can be implemented without using the same pair of wires under test. Thus a method for use in testing a telephone line can include controlling by using the same pair of wires under test, but a method can also include using the particular type of encoded control signal and/or the automatic restoring features without using the same pair of wires under test.

44 Claims, 12 Drawing Sheets

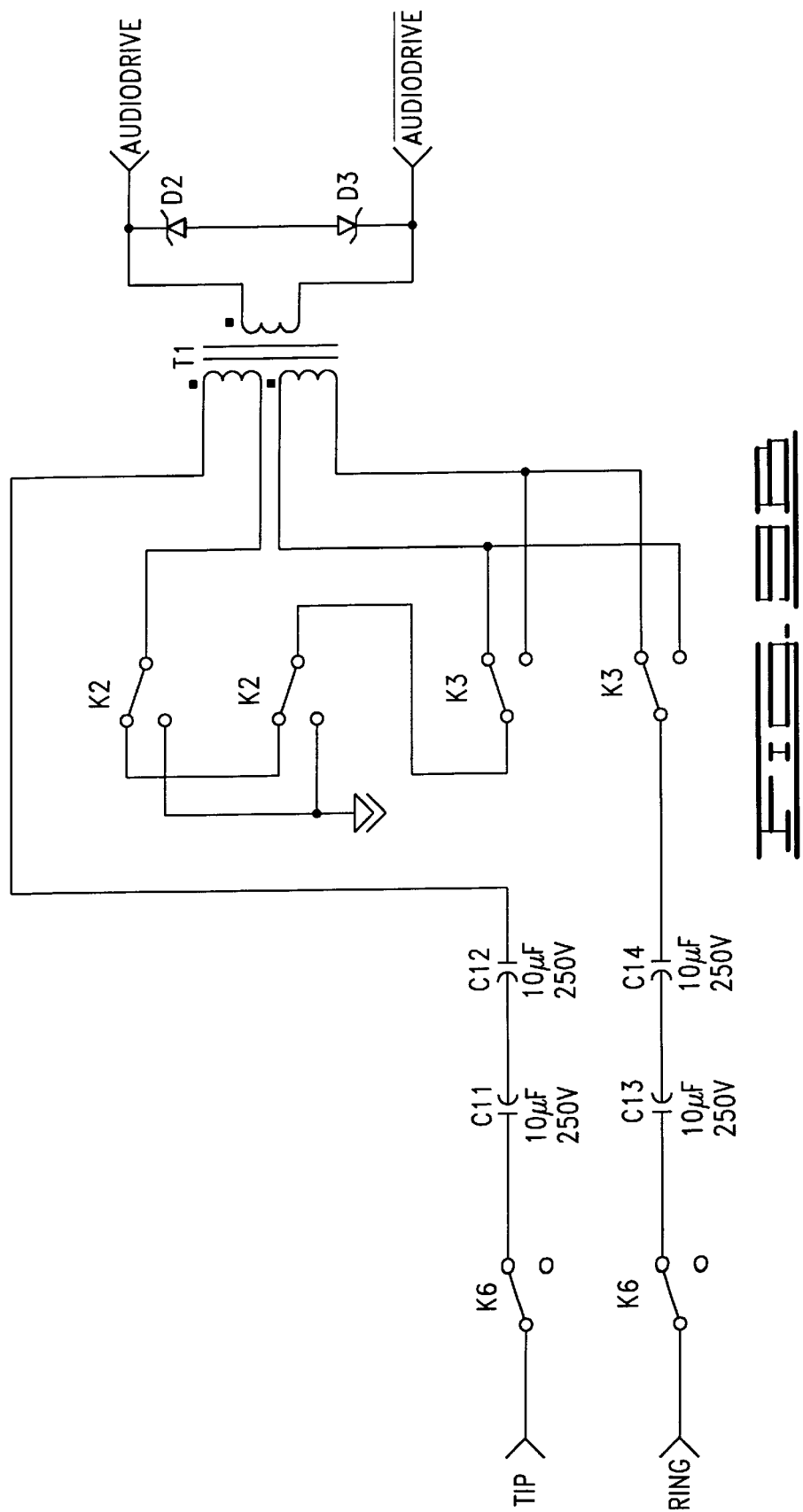

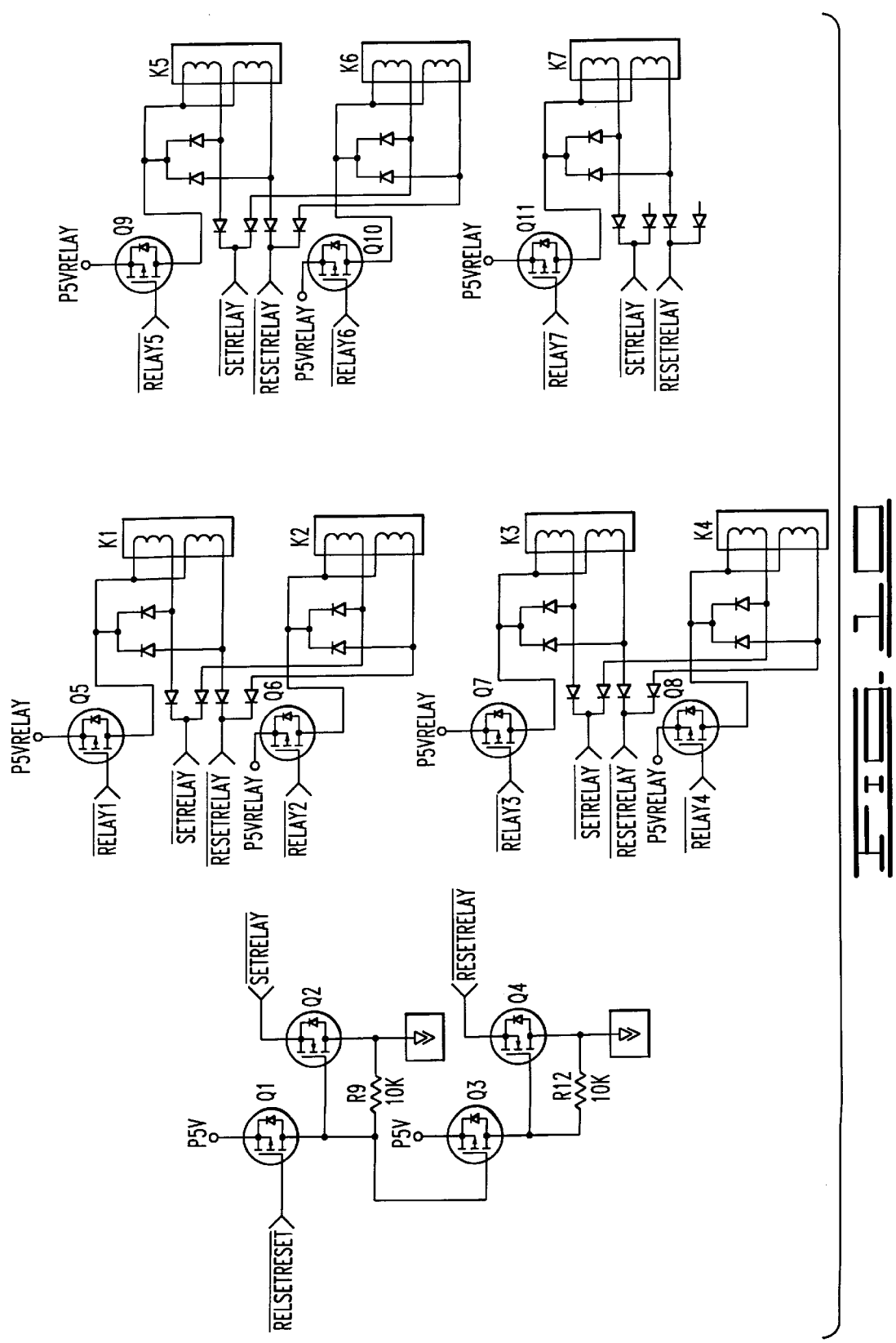

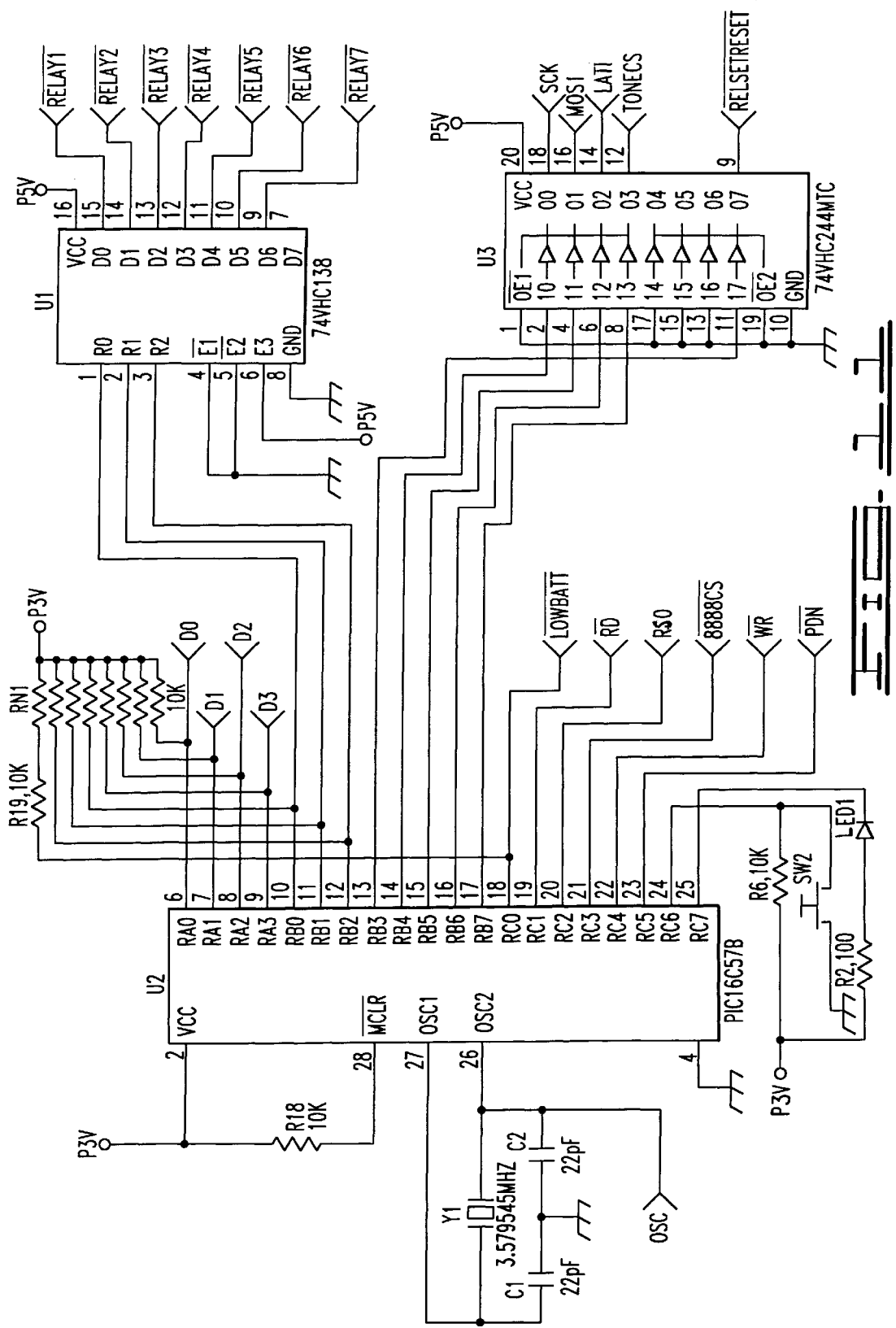

TELEPHONE TECHNICIAN'S REMOTE ASSIST APPARATUS AND METHOD

BACKGROUND OF THE INVENTION

This invention relates generally to apparatus and methods used by telephone technicians in testing and repairing telephone lines in the field. The invention relates more particularly to remote assist apparatus and methods that enable a telephone technician to control a junction in a telephone line from a remote location along the line.

A telephone line, as that term is used in this description and the following claims, includes a pair of wires in which one wire is referred to as the tip wire or side and the other as the ring wire or side (this terminology is used throughout the following description and claims and encompasses other terms that may be used in the industry; for example, "tip" encompasses the European "A" or "A side" and "ring" encompasses the European "B" or "B side"). These wires are typically individually insulated but twisted together to form a conventional twisted pair telephone line. Such a telephone line extends between a central office and a subscriber as illustrated in FIG. 1.

At least some segments of a typical telephone line are in respective cables that include other twisted wire pairs. Such cables also have outer shields that are earth grounded when the cables are installed. Referring to FIG. 1, an underground feeder cable 2 extends from a main distribution frame 4 connected to class 5 switching equipment 6 in a central office 8. The cable 2 has several twisted wire pairs, each defining a segment of a respective telephone line. Each of these segments terminates in the illustrated cross-connect box 12 in the field, such as may be located at a residential neighborhood. These can be connected at the cross-connect box 12 to other respective twisted wire pairs defining other segments of the telephone lines. In FIG. 1 these other segments are within a distribution cable 14 that extends from the junction in the cross-connect box into the neighborhood in this example. One or more such segments can end, for example, at a pedestal or aerial terminal box 16. A further segment of a respective twisted pair telephone line is a drop cable 18 extending from the junction at the pedestal or aerial terminal box 16 to a residential network interface box 20 at the subscriber site, such as house 22. The length of such a telephone line can be from several hundred feet to a few miles, for example.

When a subscriber reports a problem with his or her telephone service, the local telephone company performs tests on the circuit. Some of these tests may be internal, that is, from the central office or further upstream away from the telephone line extending into the field described above. Some tests, however, may need to be performed in the field along the telephone line. To make such field tests, a telephone technician works with the segments to try to determine which, if any, segment is causing the problem. For example, the technician might drive to the cross-connect box, disconnect the junction formed there between the respective telephone line segment in the feeder cable and the respective telephone line segment in the distribution cable, and perform tests on the segment directed toward the central office side and on the segment directed toward the subscriber side. These tests are well-known in the industry and can include forming different terminations on the tip and ring wires of the respective segment (e.g., grounding the tip and ring wires or shorting the tip and ring wires together). Some such testing can be performed with the technician's conventional butt-set; more extensive testing can be performed with other known test devices. One such device is marketed under the trademark "PairChek" by Communications Manufacturing Company of Los Angeles, Calif.

If the problem is in the portion of the telephone line extending between the cross-connect box and the subscriber in the example of FIG. 1, the technician will want to continue testing in segments to isolate the source of the problem. To test the segment between the cross-connect box and the pedestal or aerial terminal box, the technician can configure the cross-connect box end of the respective segment, drive to the pedestal or aerial location, perform the test from that end, return to the cross-connect box, and repeat the process for whatever tests and different configurations are needed. This, obviously, is very time consuming and costly. It can also leave the subscriber disconnected for extended periods. One way to reduce the time is to use a second technician so that one can work at each end of a segment; however, this is costly and requires good communication between the two technicians. Another way to reduce both the time and cost is to use an electronic apparatus at the end of any segment opposite the technician, which apparatus communicates with a test device used by the technician at his or her end of the segment.

One such electronic apparatus is the SmartStrap® cable test/remote strapping device from Communications Technology Corporation of Madison, Ala. This device connects to one end of a segment of a tip and ring wire pair and to a second telephone line over which control signals can be received. Despite this device, there is the need for a telephone technician's remote assist apparatus and method for use in testing a telephone line that enable both control and testing to occur over the same telephone line. This need is imperative in some environments, such as for a rural subscriber where only a single pair of wires is available. There is also the need for specialized control signal encoding whereby other automated response features connected to the telephone line are not activated by the control signals for the remote assist apparatus or method. Yet another need is for automated (i.e., without further external control) restoration of the telephone line so that the subscriber is not left disconnected once a test is completed.

SUMMARY OF THE INVENTION

The present invention meets the aforementioned needs by providing a novel and improved telephone technician's remote assist apparatus and method for use in testing a telephone line. This includes a method of controlling a telephone line connection from a remote location. In one aspect, the present invention operates over a single telephone line with a specialized control signal encoding that does not activate currently existing features of at least conventional U.S. telephone systems. The present invention preferably also automatically restores the telephone line within a predetermined time after a test is commenced. Circuitry for the safety of personnel is included in a particular implementation described below.

In the following, "central office" and "subscriber" are used as adjectives to define respective directions or sides unless their contexts indicate otherwise (e.g., "central office" used alone would designate a central office within the telephone system). "Switch" is used in its sense of one or more components which can be controlled to open or close an electrical circuit or path (without limiting the term "switch," other related telephone terminology includes "key," "test relay" and "test matrix").

A telephone technician's remote assist apparatus of the present invention comprises a central office side connector to connect to a pair of wires extending as a central office side of a telephone line. The apparatus also comprises a subscriber side connector to connect to a pair of wires extending as a subscriber side of the telephone line. A switch connects to the central office side connector and to the subscriber side connector. The switch is operable at least between (1) a state in which the central office side connector and the subscriber side connector are connected by the switch such that the pair of wires extending as the central office side of the telephone line is connected to the pair of wires extending as the subscriber side of the telephone line when each said pair is connected to the respective connector and (2) a state in which the central office side connector and the subscriber side connector are not connected by the switch such that the pair of wires extending as the central office side of the telephone line is disconnected from the pair of wires extending as the subscriber side of the telephone line when each said pair is connected to the respective connector. A control circuit connects to at least one of the central office side connector and the subscriber side connector and to the switch such that the control circuit changes the switch from the first-mentioned state to the second-mentioned state in response to at least one control signal sent to the control circuit through the at least one connector to which the control circuit is connected. In a particular implementation, the control circuit includes a controller responsive to control signals encoded to begin with two consecutive star (**) dual-tone multi-frequency tones. The controller preferably includes a timer in response to which the controller automatically changes the switch from the second-mentioned state to the first-mentioned state.

Another definition of the present invention is as a telephone technician's remote assist apparatus comprising: a central office side connector to connect to a pair of wires extending as a central office side of a telephone line; a subscriber side connector to connect to a pair of wires extending as a subscriber side of the telephone line; a switch connected to the central office side connector and to the subscriber side connector, wherein the switch is operable at least between (1) a state in which the central office side connector and the subscriber side connector are connected by the switch such that the pair of wires extending as the central office side of the telephone line is connected to the pair of wires extending as the subscriber side of the telephone line when each said pair is connected to the respective connector and (2) a state in which the central office side connector and the subscriber side connector are not connected by the switch such that the pair of wires extending as the central office side of the telephone line is disconnected from the pair of wires extending as the subscriber side of the telephone line when each said pair is connected to the respective connector; and a control circuit connected to the switch such that the control circuit changes the switch from the first-mentioned state to the second-mentioned state in response to at least one control signal sent to the control circuit, wherein the control circuit includes a controller having a timer in response to which the controller automatically changes the switch from the second-mentioned state to the first-mentioned state after the control circuit has changed the switch to the second-mentioned state in response to at least one control signal.

The apparatus of the present invention preferably includes a hand portable housing having the aforementioned elements mounted in or on it. A magnet can be connected to the housing to mount the apparatus at a location where it is used (e.g., inside a cross-connect box).

The present invention also provides a method of controlling a telephone line connection from a remote location. This method comprises inserting a switch into a selected telephone line having a tip wire, divisible into a central office tip wire segment and a subscriber tip wire segment, and a ring wire, divisible into a central office ring wire segment and a subscriber ring wire segment. Inserting the switch includes: connecting the central office tip wire segment to a central office tip terminal of the switch, connecting the subscriber tip wire segment to a subscriber tip terminal of the switch, connecting the central office ring wire segment to a central office ring terminal of the switch, and connecting the subscriber ring wire segment to a subscriber ring terminal of the switch. This method further comprises transmitting, from a telephone technician's testing device connected to the subscriber tip wire segment and the subscriber ring wire segment at a location remote from the switch, at least one control signal over the subscriber tip wire segment and the subscriber ring wire segment to a circuit connected to the subscriber tip terminal, the subscriber ring terminal and the switch. This method still further comprises operating the switch with the circuit in response to the at least one control signal.

The present invention also provides a method for use in testing a telephone line. One definition of this comprises: connecting a telephone technician's remote assist apparatus into a single telephone line between a central office side and a subscriber side of the telephone line, wherein the telephone line is to be tested by a telephone technician located remote from the apparatus; receiving into the apparatus one or more control signals sent by the telephone technician over the telephone line; and open-circuiting the telephone line between the central office side and the subscriber side inside the apparatus in response to at least one control signal sent by the telephone technician over the telephone line.

Another definition of a method for use in testing a telephone line comprises: inserting a switch into a selected telephone line having a tip wire, divisible into a central office tip wire segment and a subscriber tip wire segment, and a ring wire, divisible into a central office ring wire segment and a subscriber ring wire segment, wherein inserting the switch includes: connecting the central office tip wire segment to a central office tip terminal of the switch, connecting the subscriber tip wire segment to a subscriber tip terminal of the switch, connecting the central office ring wire segment to a central office ring terminal of the switch, and connecting the subscriber ring wire segment to a subscriber ring terminal of the switch; transmitting at least one control signal, encoded to begin with two consecutive star (**) dual-tone multi-frequency tones, to a circuit connected to the switch; and operating the switch with the circuit in response to the at least one control signal.

Still another definition of a method for use in testing a telephone line comprises: inserting a switch into a selected telephone line having a tip wire, divisible into a central office tip wire segment and a subscriber tip wire segment, and a ring wire, divisible into a central office ring wire segment and a subscriber ring wire segment, wherein inserting the switch includes: connecting the central office tip wire segment to a central office tip terminal of the switch, connecting the subscriber tip wire segment to a subscriber tip terminal of the switch, connecting the central office ring wire segment to a central office ring terminal of the switch, and connecting the subscriber ring wire segment to a subscriber ring terminal of the switch; receiving at least one control signal in a circuit connected to the switch; operating the switch with the circuit in response to the at least one control signal, wherein operating the switch in response to at least one control signal includes opening the switch between the central office tip terminal and the subscriber tip terminal and between the central office ring terminal and the subscriber ring terminal; and automatically closing the switch between the central office tip terminal and the subscriber tip terminal and between the central office ring terminal and the subscriber ring terminal in response to lapse of a predetermined time after said opening.

Yet another definition of a method for use in testing a telephone line comprises: inserting a switch into a selected telephone line having a tip wire, divisible into a central office tip wire segment and a subscriber tip wire segment, and a ring wire, divisible into a central office ring wire segment and a subscriber ring wire segment, wherein inserting the switch includes: connecting the central office tip wire segment to a central office tip terminal of the switch, connecting the subscriber tip wire segment to a subscriber tip terminal of the switch, connecting the central office ring wire segment to a central office ring terminal of the switch, and connecting the subscriber ring wire segment to a subscriber ring terminal of the switch; transmitting, from a location remote from the switch, a control signal encoded to begin with two consecutive star (**) dual-tone multi-frequency tones, wherein the transmitting occurs over the subscriber tip wire segment and the subscriber ring wire segment to a circuit connected to the subscriber tip terminal and the subscriber ring terminal and to the switch; and decoding the control signal in the circuit, and in response thereto, (1) opening the switch between the central office tip terminal and the subscriber tip terminal and between the central office ring terminal and the subscriber ring terminal, (2) conforming the ends of the subscriber tip wire segment and the subscriber ring wire segment respectively connected to the subscriber tip terminal and the subscriber ring terminal to a test configuration determined in response to the control signal, and (3) closing the switch between the central office tip terminal and the subscriber tip terminal and between the central office ring terminal and the subscriber ring terminal in response to lapse of a predetermined time responsive to the control signal.

Therefore, from the foregoing, it is a general object of the present invention to provide a novel and improved telephone technician's remote assist apparatus and method for use in testing a telephone line, including a method of controlling a telephone line connection from a remote location. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 8 is a schematic and block diagram for the particular implementation of the remote assist apparatus.

FIGS. 9A–9D are schematic circuit diagrams of relays for the main switch and the test circuits of the particular implementation.

FIG. 10 is a schematic circuit diagram of switching components for operating the relays of FIGS. 9A–9D.

FIG. 11 is a schematic circuit diagram of a microcontroller circuit of the particular implementation.

DETAILED DESCRIPTION OF THE INVENTION

Figure 1:
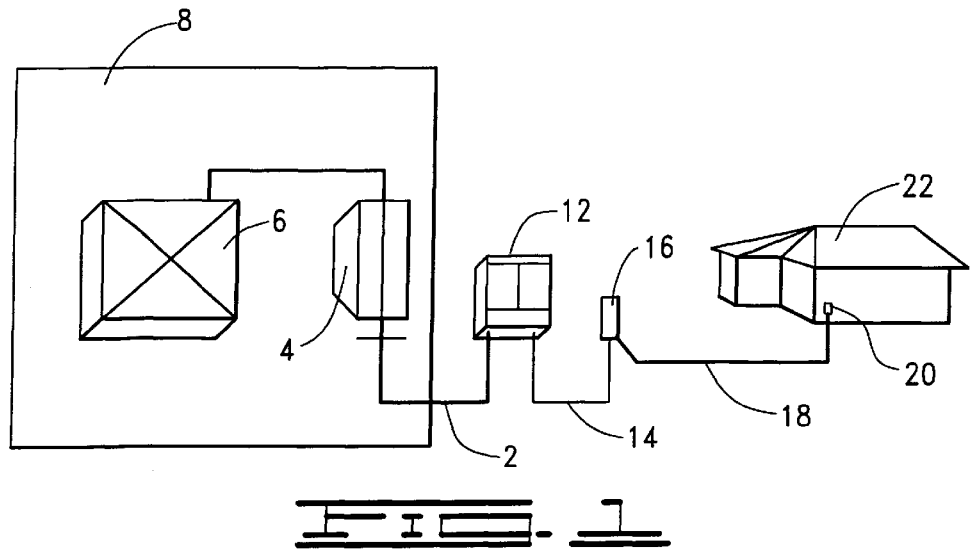
FIG. 1 illustrates one environment in which the present invention can be used.

FIG. 1 described above and the definitions regarding "central office," "subscriber" and "switch" set forth above are incorporated by reference for the following description of the present invention. These definitions are also applicable to the appended claims.

Figure 2:
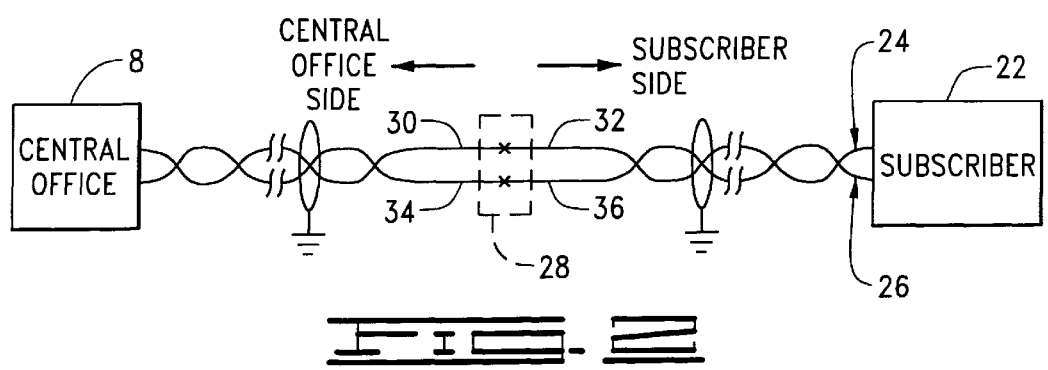
FIG. 2 illustrates a telephone technician's remote assist apparatus of the present invention connected into a telephone line comprising a twisted pair of tip and ring wires.

A simplified schematic in FIG. 2 illustrates a single telephone line having tip wire 24 and ring wire 26 intended to provide dial tone from central office 8 to subscriber 22. The tip wire 24 and the ring wire 26 are made of series connected conventional twisted pairs in shielded cables as described with regard to FIG. 1. A telephone technician's remote assist apparatus 28 of the present invention is shown connected into the telephone line. Theoretically, this interconnection can be anywhere along the telephone line. Typically, however, the apparatus 28 is connected at an existing junction, such as at the cross-connect box 12, the pedestal or aerial terminal box 16, or the residential interface box 20 shown in FIG. 1. Wherever the apparatus 28 is connected in the telephone line, there is then a central office side and a subscriber side as indicated in FIG. 2. This divides the tip wire 24 into a central office tip wire segment 30 and a subscriber tip wire segment 32 defined relative to the apparatus 28. This also divides the ring wire 26 into a central office ring wire segment 34 and a subscriber ring wire segment 36 relative to the apparatus 28. Each segment can include one integral segment of continuous wire or two or more connected shorter segments.

Figure 3:
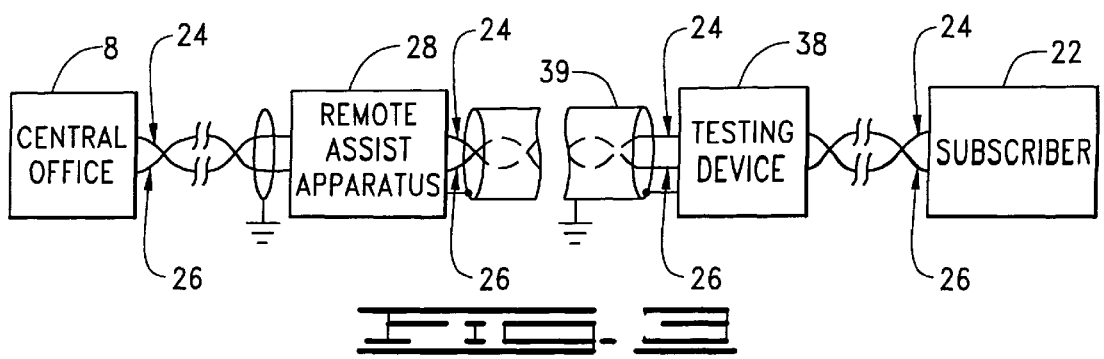
FIG. 3 illustrates the environment of FIG. 2 with the addition of a testing device connected into the telephone line.

FIG. 3 illustrates one example of the telephone technician's remote assist device connected into the telephone line's tip wire 24 and ring wire 26 along with a testing device 38 also connected into these wires. For example, the apparatus 28 connects to these wires at the cross-connect box 12, and the testing device 38 connects to these wires at the pedestal or aerial terminal box 16 of the FIG. 1 environment. Both the apparatus 28 and the device 38 are shown also connected to the earth grounded shield 39 of the cable containing the tip and ring wire segments extending between the apparatus 28 and device 38. The testing device 38 can be any suitable device that can at least send dual-tone multi-frequency tones onto the tip and ring wires. The device 38 preferably also can perform one or more tests on the connected tip and ring wires. A non-limiting implementation of the device 38 is the "PairChek" testing device from Communications Manufacturing Company of Los Angeles, Calif.

Figure 4:
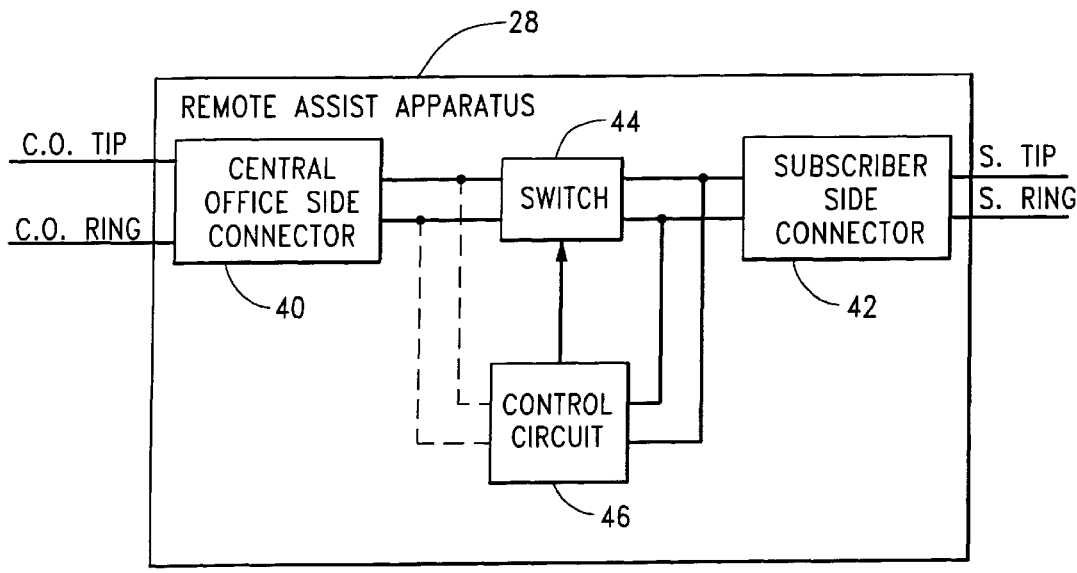
FIG. 4 is a block diagram for a remote assist apparatus of the present invention.

Referring to FIG. 4, the remote assist apparatus 28 comprises a central office side connector 40 to connect to the pair of tip and ring wires extending as the central office side of the telephone line relative to the apparatus 28. The apparatus 28 of FIG. 4 also includes a subscriber side connector 42 to connect to the pair of tip and ring wires extending as the subscriber side of the telephone line relative to the apparatus 28.

The apparatus 28 of FIG. 4 also comprises a switch 44 connected to the central office side connector 40 and to the subscriber side connector 42. The switch 44 is operable at least between (1) a state in which the central office side connector and the subscriber side connector are connected by the switch such that the pair of wires extending as the central office side of the telephone line is connected to the pair of wires extending as the subscriber side of the telephone line when each said pair is connected to the respective connector and (2) a state in which the central office side connector and the subscriber side connector are not connected by the switch such that the pair of wires extending as the central office side of the telephone line is disconnected from the pair of wires extending as the subscriber side of the telephone line when each said pair is connected to the respective connector.

The apparatus 28 of FIG. 4 still further includes a control circuit 46 that is connected to at least one of the central office side connector 40 and the subscriber side connector 42 and to the switch 44 such that the control circuit 46 changes the switch 44 from the first-mentioned state to the second-mentioned state in response to at least one control signal sent to the control circuit through the at least one connector to which the control circuit is connected. In one particular use of the apparatus 28, it connects only to the tip and ring wires extending to one side of the apparatus. This can be either the subscriber side as illustrated by the solid connecting lines in FIG. 4 or the central office side as illustrated by the dashed connecting lines in FIG. 4. In another embodiment, the control circuit 46 can be designed to connect to both sides so that it can receive control signals from either side even if the switch 44 is open (i.e., disconnects the two sides through the apparatus 28).

Although the apparatus 28 shown in FIG. 4 has its control circuit 46 connected to at least one side of the same telephone line to which the connectors and switch connect, the control signal encoding and the telephone line restoring (i.e., reconnecting) aspects of the present invention do not require that the control circuit be connected to this same telephone line.

As labeled in FIG. 4, the connectors 40, 42 designate that one set of connectors of the apparatus 28 connects to the central office side and the other set connects to the subscriber side. A particular set of connectors on the apparatus 28 can, however, be connected as either the central office side or the subscriber side. This is represented in the schematic and block diagram of FIG. 5 in which each connector has a respective tip terminal and ring terminal that is indicated to be connectable to either the central office side or the subscriber side. In any one usage, only one set of terminals is connected to a side so that when one set of terminals is connected to the central office side, the other set is connected to the subscriber side and vice versa. In the particular implementation that is described below with regard to FIGS. 6–14, however, different types of terminal connectors are used and typically one is intended for central office side connections and the other for subscriber side connections (but they are not limited to these respective connections as mentioned above).

Figure 5:
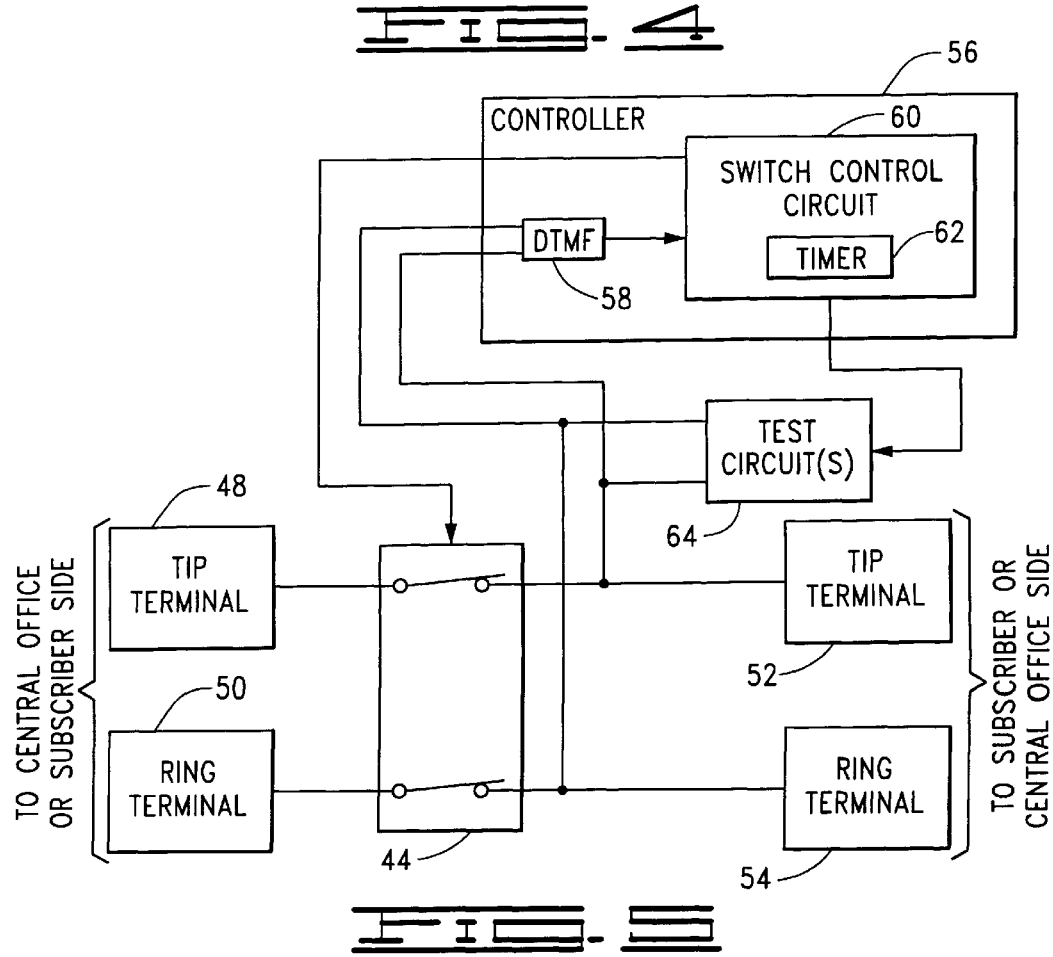
FIG. 5 is a more detailed block diagram for a preferred embodiment of the remote assist apparatus.
Figure 6:
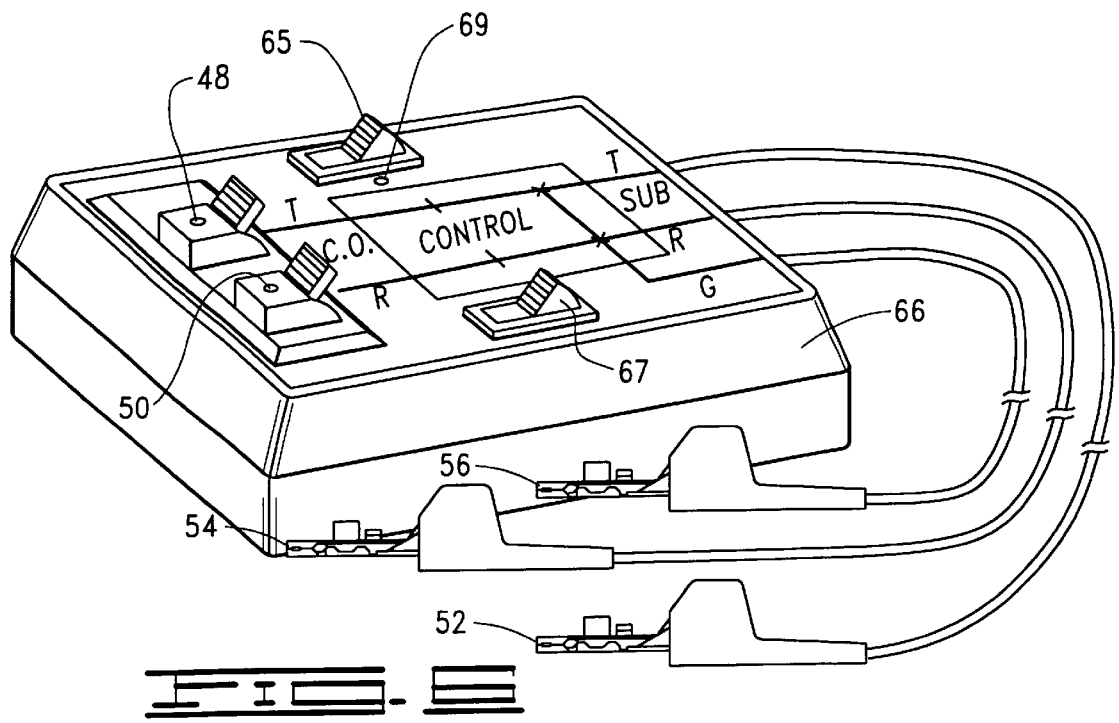
FIG. 6 illustrates a front external perspective view of a particular implementation of the remote assist apparatus.

Still referring to FIG. 5, this embodiment includes tip terminal 48 and ring terminal 50 of one connector. This embodiment also includes tip terminal 52 and ring terminal 54 of another connector. In FIG. 6, the tip terminal 48 and the ring terminal 50 are implemented with two spring loaded wire connectors like those used by stereo equipment manufacturers but preferably of a type suitable for ruggedized outdoor use in the telephone industry. The tip terminal 52 and the ring terminal 54 are implemented in FIG. 6 by test leads conventional in the telephone industry. A third test lead 56 shown in FIG. 6 connects to the shield or ground of the subscriber side cable. The invention is not limited to these specific types of connectors. Furthermore, the same type of connector can be used for both sets.

The switch 44 of the FIG. 5 embodiment is implemented to function as a double-pole double-throw switch. It is contemplated that this can be by a mechanical, electronic or electromechanical switch or other suitable means that achieves the desired switching function; however, the present preferred implementation is by an electromechanical relay. As apparent in FIG. 5, one pole and related terminal and switch element function to connect/disconnect the tip wire segments when connected to the respective connector terminals, and the other pole and related terminal and switch element function to connect/disconnect the ring wire segments when connected to the respective connector terminals.

In the implementation of FIG. 5, the control circuit 46 includes a controller 56. The controller 56 comprises a dual-tone multi-frequency (DTMF) detector 58 (which also functions as a DTMF transmitter in the particular implementation described below) that is connected to at least one of the connectors. In FIG. 5, the DTMF detector 58 connects to the tip terminal 52 and the ring terminal 54. Thus, when the switch 44 is open (the position not shown in FIG. 5), the detector 58 can receive externally sent tones only through the wires connected to the terminals 52, 54. When the switch 44 is closed, the detector can receive tones from either the central office direction or the subscriber direction.

The controller 56 is also shown in FIG. 5 to include a switch control circuit 60 connected to the DTMF detector 58. In the particular implementation further described below, the switch control circuit 60 is programmable. In that implementation, the circuit 60 is programmed to detect at least one control signal encoded in dual-tone multi-frequency tones received by the detector 58 and to operate the switch 44 in response thereto to disconnect the central office tip wire segment from the subscriber tip wire segment and to disconnect the central office ring wire segment from the subscriber ring wire segment.

The switch control circuit 60 also includes a timer 62. This can be implemented by hardware or software or a combination thereof. In whatever type of implementation is used, the timer measures a predetermined time period relative to when the switch control circuit 60 operates the switch 44 to disconnect the central office tip wire segment from the subscriber tip wire segment and to disconnect the central office ring wire segment from the subscriber ring wire segment. The switch control circuit 60 is further programmed to operate the switch 44 to reconnect the central office tip wire segment to the subscriber tip wire segment and to reconnect the central office ring wire segment to the subscriber ring wire segment at the end of the predetermined time period measured by the timer 62. This can be referred to as the line restoring or restoration feature of the present invention, and this feature can be used apart from the control signal over the same telephone line feature of the invention. That is, this restoration feature can be used even if the control circuit 46 or the controller 56 is not connected to the same telephone line as are the terminals 48, 50, 52, 54 or as is the switch 44. As such, the control circuit merely need be connected to the switch 44 so that the control circuit automatically restores the telephone line (i.e., reconnects the subscriber side to the central office side) when the predetermined time period lapses. This ensures that the subscriber is not left disconnected.

The implementation of FIG. 5 also includes one or more test circuits 64. These are controlled by the controller 56 in response to control signals received by the detector 58 in the illustrated implementation. In the illustrated implementation, at least one detected control signal initiates the switch control circuit operation of both the switch 44 and at least one test circuit. Each test circuit of this implementation connects to the tip terminal 52 and the ring terminal 54 to configure the ends of connected tip and ring wire segments as further described below. In this implementation, the switch control circuit 60 automatically operates the switch 44 to reconnect the central office tip wire segment to the subscriber tip wire segment and to reconnect the central office ring wire segment to the subscriber ring wire segment within a predetermined time period relative to operating at least one such test circuit 64.

The components described above with reference to FIG. 5 are disposed in or on a hand portable housing 66 having a particular implementation illustrated in FIG. 6. Externally it retains the terminals 48, 50, 52, 54 and the ground/shield connector 56. Also on the outside front are two switches 65, 67 and a light-emitting diode (LED) 69 further described below. In the particular implementation, the housing 66 is a shirt-pocket sized rugged water-resistant plastic box having a cavity in which the circuits of FIGS. 9–14 are contained and further having a battery compartment in which to house four AA batteries. An auxiliary RJ-11 jack wired in parallel to the subscriber side to facilitate connection at the network interface 20 of subscriber premises is housed in and accessible through the housing 66 in the particular implementation. A belt holster for the telephone technician can be provided for storing the apparatus when it is not in use.

Figure 7:
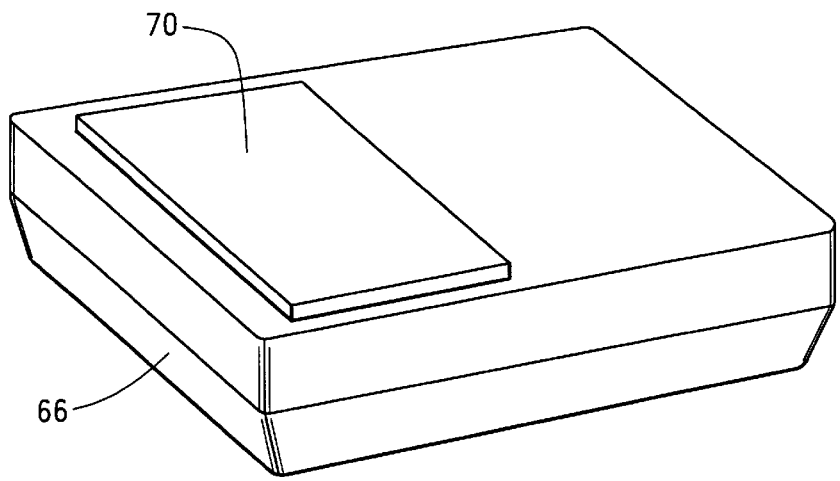
FIG. 7 illustrates a rear external perspective view of the particular implementation of the remote assist apparatus.
Figure 5:
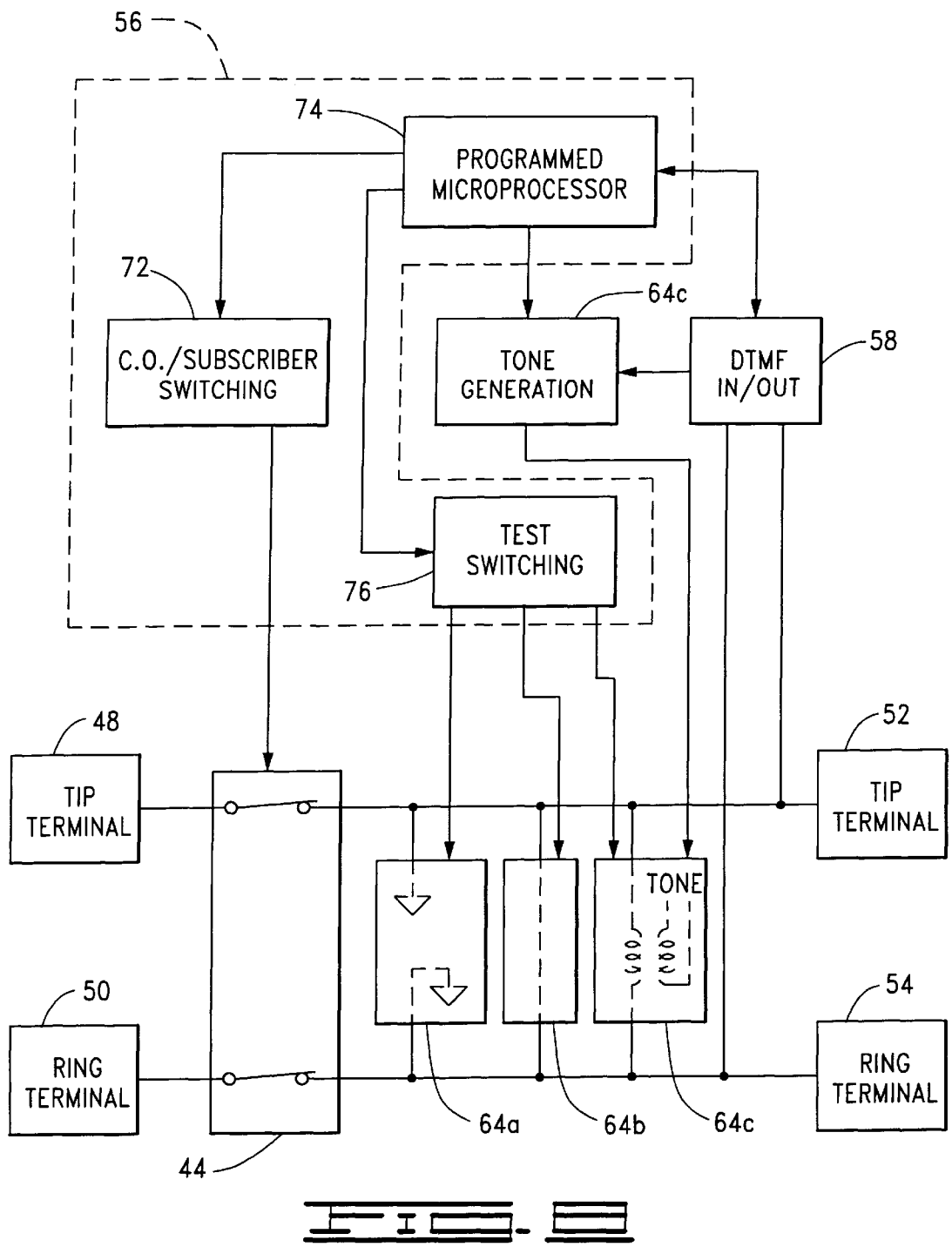
Figure 3A:
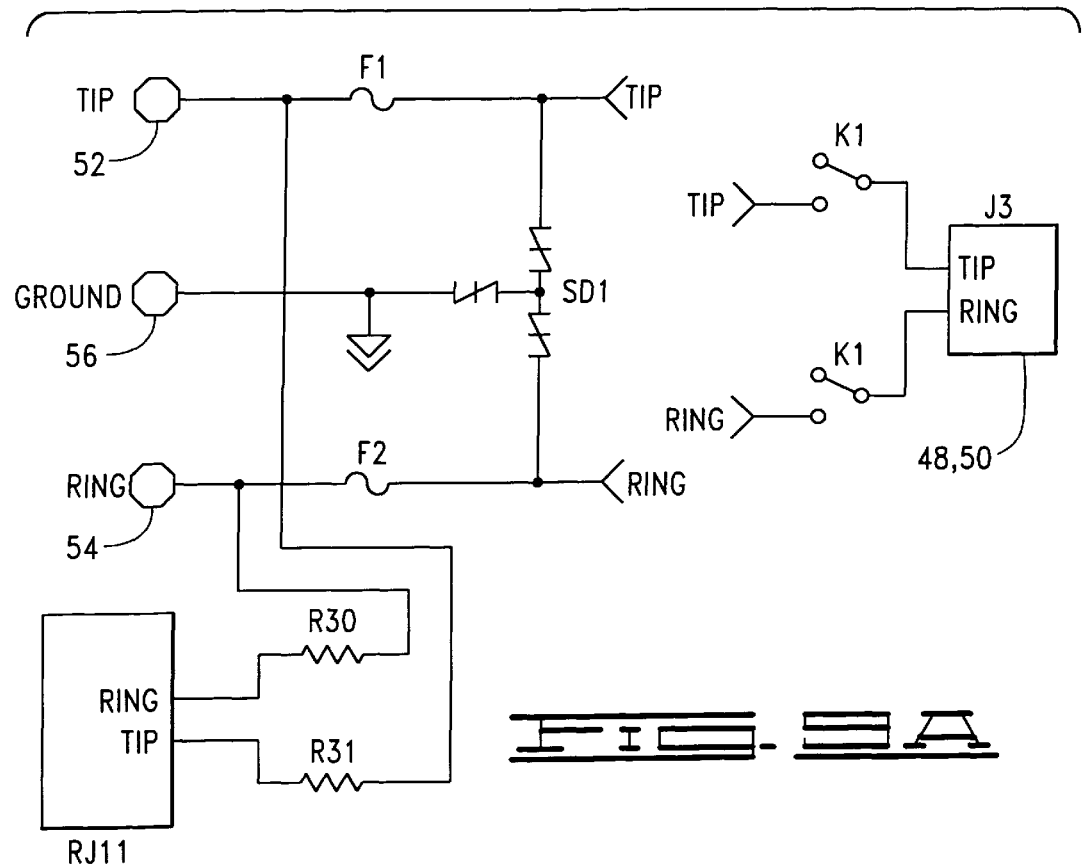
Figures 3C, 3D:
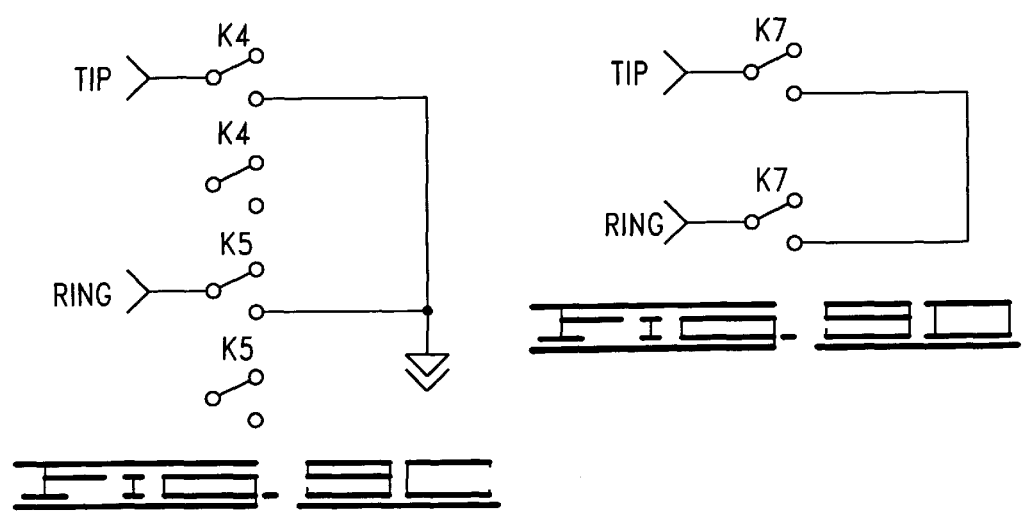

Referring to FIG. 7, a magnet 70 is connected to the outside rear of the housing 66. The magnet 70 can be used to mount the apparatus 28 at a location where it is used. One non-limiting example is inside the cross-connect box 12. The magnet 70 can be of any suitable material, but a preferred material is a flexible magnetic material (e.g., a rubber magnetic material).

A more detailed block diagram for a particular implementation of the preferred embodiment of FIG. 5 is shown in FIG. 8. The additional detail shows that the switch control circuit 56 includes central office/subscriber switching components 72 that operate the switch 44 in response to a programmed microprocessor-based circuit 74. The programmed microprocessor-based circuit 74, subsequently referred to as a microcontroller, also controls test switching components 76. In the particular implementation of FIG. 8, the test switching components 76 operate three test circuits: a circuit 64a that selectably grounds either or both of the tip and ring terminals 52, 54 when the switch 44 is opened, a circuit 64b that shorts the two terminals 52, 54 together when the switch 44 is opened, and a circuit 64c that generates one or more tones and outputs it/them across the tip and ring terminals 52, 54 when the switch 44 is opened. Part of the test circuit 64c can be used for providing a quiet termination to terminals 52, 54. These can be selected as different test matrices to provide various respective terminations to the wires under test. The other components of FIG. 8 are as correspondingly marked in FIG. 7. Specific circuits implementing the foregoing are shown in FIGS. 9–14 and a program flow diagram is shown in FIG. 15.

The switch 44 is implemented in the circuit of FIG. 9A by double-pole relay K1. The poles of the relay are connected to tip and ring terminals 48, 50. One set of relay terminals is open, and the terminals of the other set are connected to the tip and ring terminals 52, 54. These tip and ring terminals 52, 54 connect through fuses F1 and F2 that open when SD1 passes energy. If enough energy is passed through SD1, one or more of these fuses opens. This protects the apparatus and/or apparatus operator. SD1 are sidactors that pass current if the voltage between any two of the three legs is above its voltage rating. This clamps tip, ring and ground to each other and to a safe level. FIG. 9A also shows that the subscriber side tip and ring in this implementation can come via the illustrated RJ-11 connector.

Referring to FIG. 9B, test circuit 64c includes relays K2, K3 and K6. K2 is used in conjunction with K3 to select between metallic and longitudinal tone output configurations. K6 allows for output transformer T1 to be connected to the subscriber tip and ring. This allows the apparatus 28 to provide a quiet termination for, or to output tones on, the subscriber tip and ring pair. C11, C12, C13, C14 are high voltage capacitors to isolate high direct current (DC) voltages from T1. Diodes D2 and D3 clamp alternating current (AC) spikes that are caused by K6 opening or other potential line spike hazards.

Test circuit 64a of the specific implementation includes relays K4 and K5 shown in FIG. 9C. K4 allows for the subscriber side tip wire to be grounded. K5 allows for the subscriber side ring wire to be grounded.

To implement the shorting function of test circuit 64b, a relay K7 illustrated in FIG. 9D is used.

Relay K1 is operated by central office/subscriber switching 72, and the other relays are operated by test switching 76. The specific implementation of these components 72, 76 is shown in FIG. 10 wherein the schematically illustrated coils of the relays are marked by the same references as the relays shown in FIGS. 9A–9D.

All the relays have respective set and reset coils. The negative "set" side of these coils are tied together through diodes and the negative "reset" sides are tied together through diodes as illustrated in FIG. 10. These are the common "set" and "reset" control lines. Transistors Q1, Q2 (set) and Q3, Q4 (reset) shown in FIG. 10 control these lines. These mosfets are controlled by the microcontroller 74 having a particular implementation shown in FIG. 11.

In FIG. 11 the microcontroller 74 includes U2, a PIC 16C57B, as one example for this particular implementation. With the built-in reset circuit of U2, only R18 is needed to get the unit into operation when the on/off switch SW1 (FIG. 14) turns the apparatus 28 on. Since U2 has high impedance inputs, all ports that are configured as inputs need to be pulled up. Resistors RN1 do this. Resistor R19 and one of the 10K pull up resistors make a 20K pull up for the switching regulator low battery line. A switch SW2 (switch 67 in FIG. 6) allows for the microcontroller to sense when the operator wishes to generate tracing tones immediately. LED1 (LED 69 in FIG. 6) gives visual feedback as to whether the apparatus is on or off. U1 and U3 of FIG. 11 isolate the 5-volt part of the system from the 3-volt system. The microcontroller and the DTMF transceiver (FIG. 12) both run on 3.0 volts(DC). U1 and U3 are VHC devices that allow for mixed logic level operation. U1 is a 3-line to 8-line decoder that allows the microcontroller to use a minimum of lines to control the relays. U3 is used as a buffer to isolate the 5-volt audio section from the 3-volt digital section.

Referring again to FIG. 10, an individual relay is first selected by a respective set of digital signals provided by the microcontroller to the 3-line inputs of U1 in FIG. 11. U1 translates this signal to a 1 of 8 active low signal. This active low signal turns on the respective one of mosfets Q5–Q11 in FIG. 10. Each such transistor is connected to the common positive side of the set and reset coils for the respective relay. When the relay in question is selected in this manner and either the common set or reset line is selected, that relay is either set or reset. As illustrated in FIG. 10, anti-kickback diodes are attached across the coils to protect against potentially destructive inductive kickback voltages.

Figure 12:
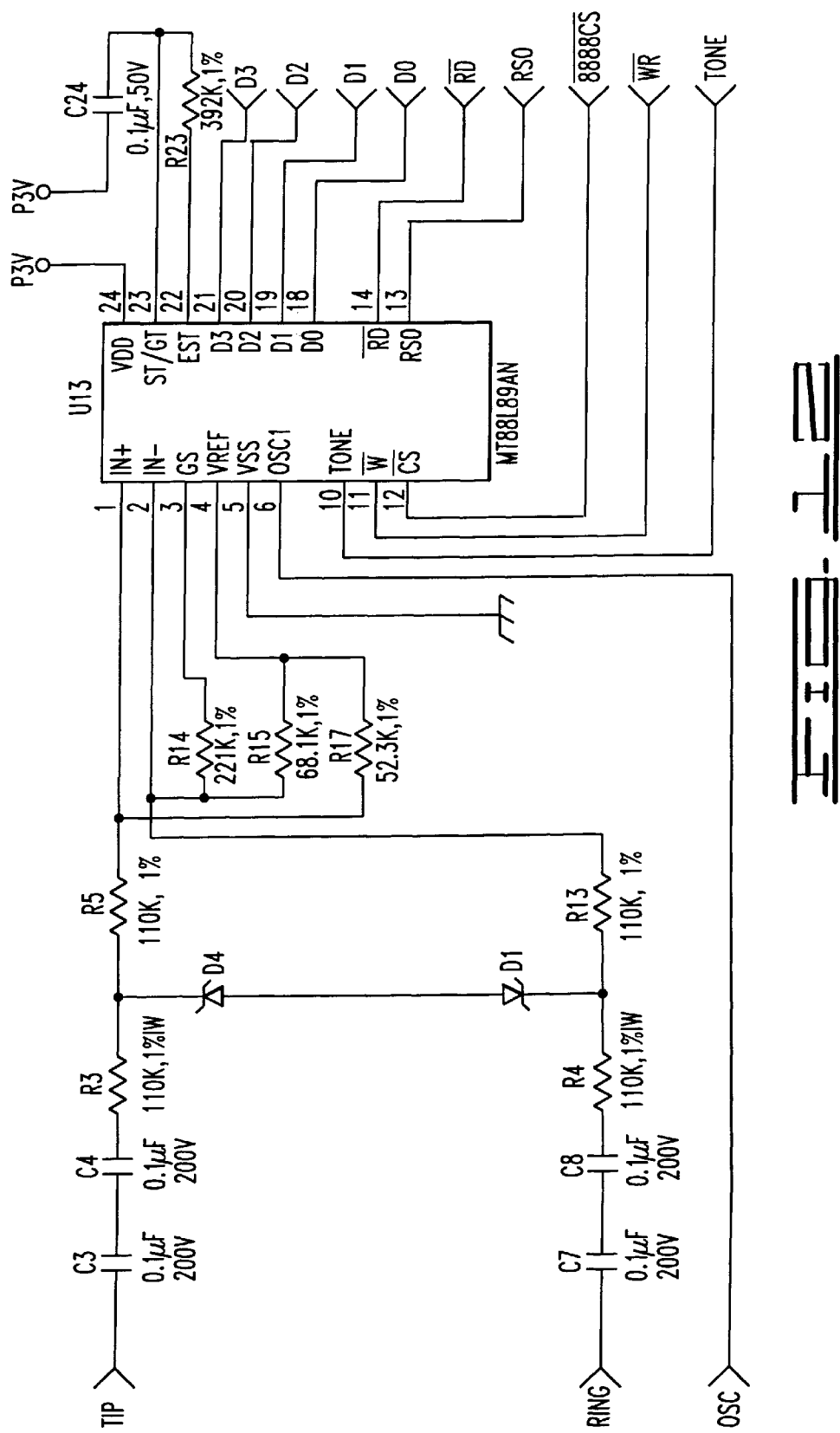
FIG. 12 is a schematic circuit diagram of a dual-tone multi-frequency transceiver circuit of the particular implementation.

The DTMF detector is a receiver/transmitter in the specific implementation shown in FIG. 12 and connects to the internal tip and ring conductors through capacitors C3, C4, C7, C8. These are high voltage isolation devices that protect the high impedance DTMF device from the normal high voltages found on telephone lines. Resistors R3, R4 and diodes D1, D4 of FIG. 12 are devices which absorb AC voltages that are greater than 16 volts. This includes pulsating voltages like the ring voltage or lightning strikes or static electricity. The DTMF transceiver is device U13, which is a Mitel MT88L89 3-volt device. This allows the apparatus 28 to listen for the DTMF commands as well as transmit DTMF responses. Capacitor C24 and resistor R23 of FIG. 12 are chosen to define a suitable gate time. U13 uses the oscillator that is generated from the microcontroller clock shown in the schematic of FIG. 11 ("osc"). The DTMF sampling must not load the subscriber tip and ring pair under test. Digital signals representing a detected DTMF tone are provided to U2 in FIG. 11 via data lines D0–D3, and digital signals from U2 to generate a DTMF tone are sent over these same data lines.

Figure 13:
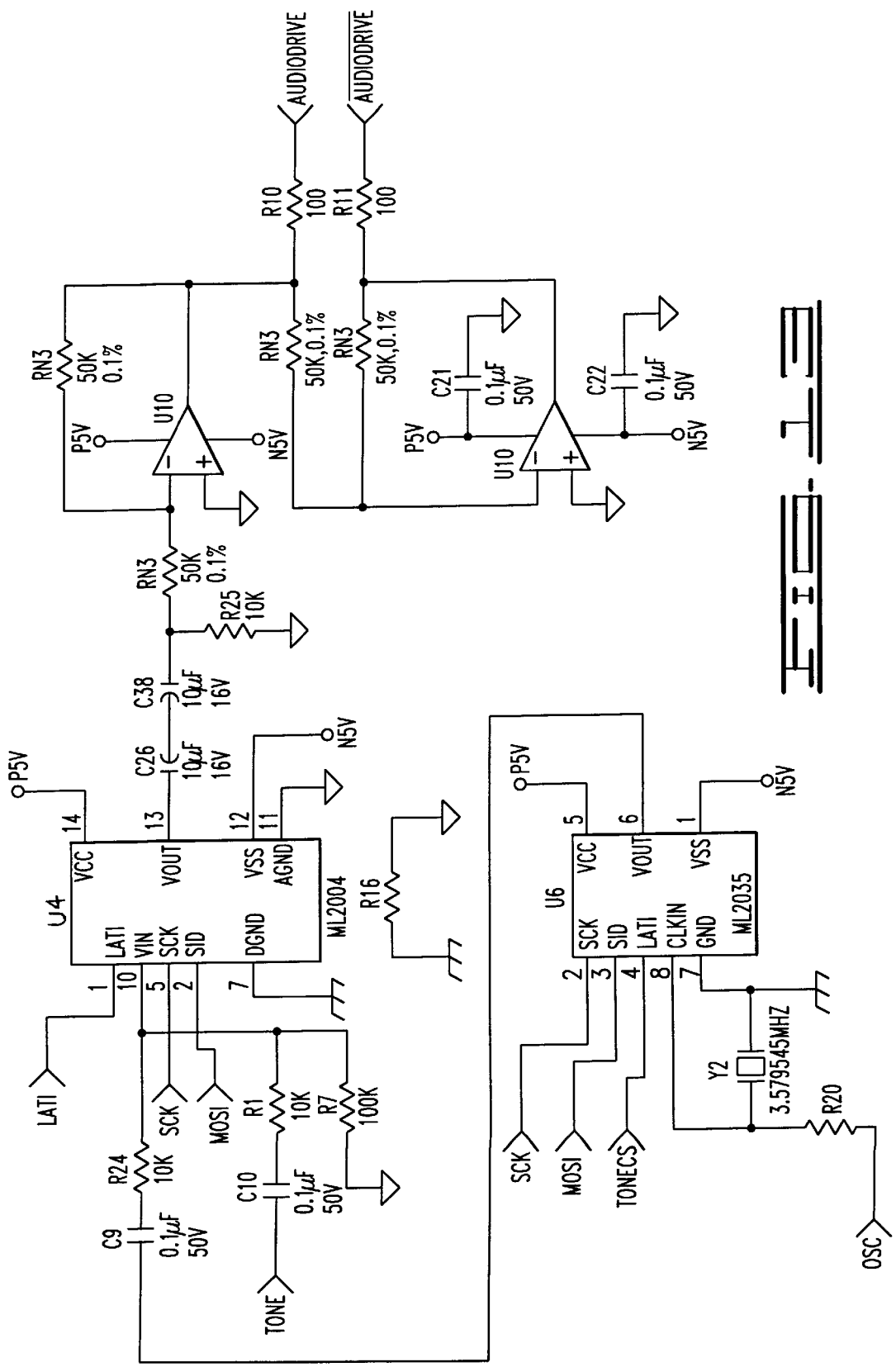
FIG. 13 is a schematic circuit diagram of a test tone generating portion of a test circuit of the particular implementation.

The particular implementation of the apparatus 28 has the ability to generate precise tones at precise decibel levels for line transmission insertion loss testing. These are output through transformer T1 and the relays shown in FIG. 9B. The apparatus 28 of the illustrated implementation can generate a standard ten tone test or a standard fifteen tone test. Each tone's sine wave is generated using the Micro Linear ML2035 shown as device U6 in FIG. 13. This is a digital sine wave generator. The sine wave is generated according to commands given to it from the microcontroller through the Serial Protocol Interface (SPI) bus. The sine wave that is generated is then sent to the ML2004 shown as device U4 in FIG. 13. Any DTMF tones generated by the MT88L89 of FIG. 12 are summed into the input into U4. The ML2004 is a digitally controlled attenuator. It is controlled by the microcontroller through the SPI bus. This device takes the summed signal and either increases the decibel level or decreases the decibel level to give the output amplifiers an appropriate signal to send. The output driver amplifiers are defined with U10 shown in FIG. 13. They are used to drive transformer T1 and are configured in the classic push pull mode of operation. Resistors R7 and R25 of FIG. 13 are used to sink leakage voltage that the coupling capacitors may bleed. These resistors are necessary because the output of the ML2035 and the output of the ML2004 have a slight positive DC offset at their outputs. In case of capacitor leakage the operational amplifiers could saturate at the more positive rail on highly driven outputs. Resistors R10 and R11 in FIG. 13 give a resistive load in case there is a direct short on the output of T1. The tones that can be generated in the specific implementation include:

244 Hz±0.5%
404 Hz±0.5%
704 Hz±0.5%
1004 Hz±0.5%
1304 Hz±0.5%
1604 Hz±0.1%
1904 Hz±0.1%
2204 Hz±0.1%
2504 Hz±0.1%
2804 Hz±0.1%
3004 Hz±0.1%
3204 Hz±0.1%
3404 Hz±0.1%
3504 Hz±0.1%
3604 Hz±0.1%
3674 Hz±0.1%

Figure 14:
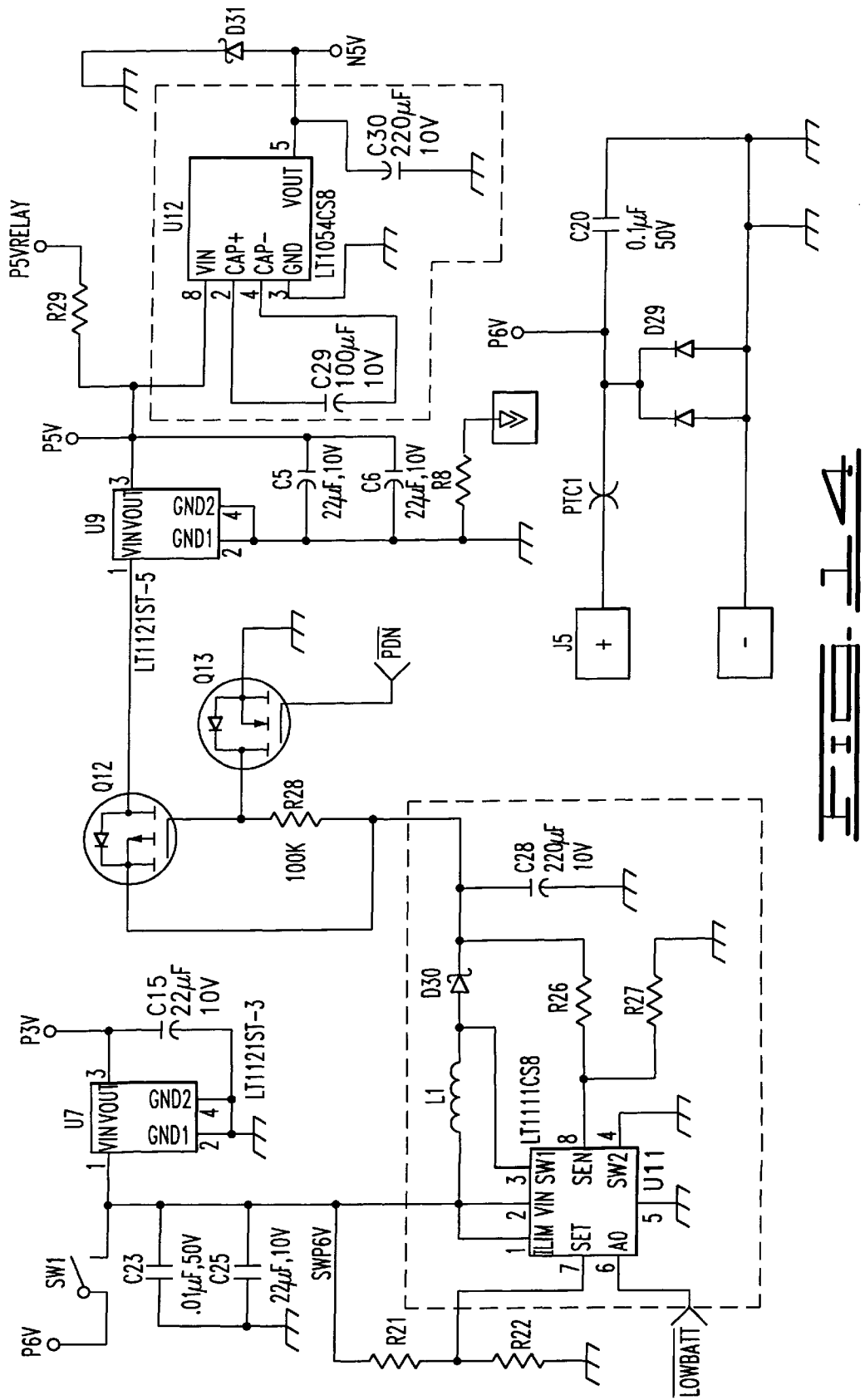
FIG. 14 is a schematic circuit diagram of a power circuit of the particular implementation.
Figure 15:
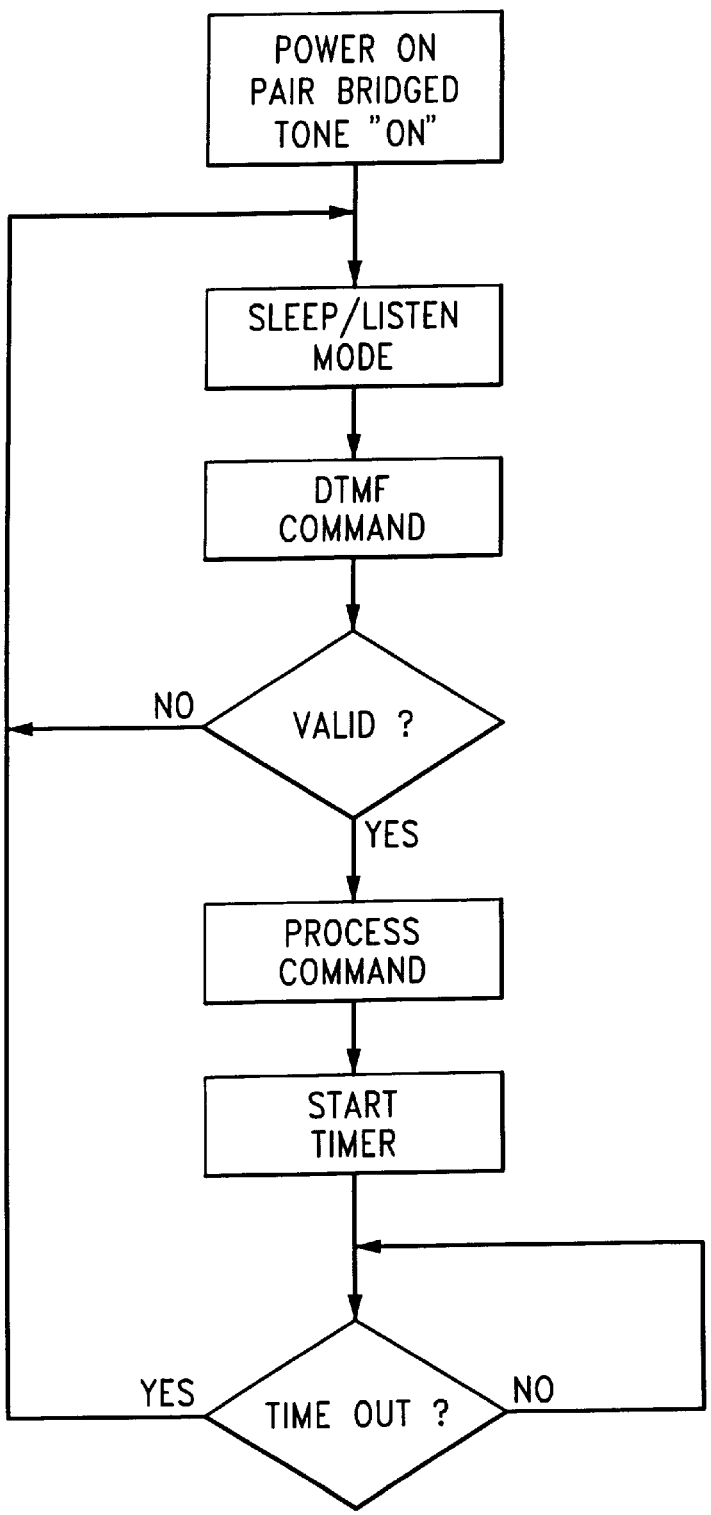
FIG. 15 is a flow diagram for a program for the particular implementation of the remote assist apparatus.

Referring to FIG. 14, SW1 (switch 65 in FIG. 6) is the main power switch for the apparatus 28 of the particular implementation. When turned on, it connects the six volts (DC) output of the battery power source to low drop out linear regulator U7. The 3.0 volts(DC) output of U7 powers the microcontroller U2 (FIG. 11) and DTMF transceiver MF88L89 U13 (FIG. 12). The battery power source connects through the circuit connected to the + and − terminals of J5 shown in FOG. 14.

The battery energy is also supplied to U11 of FIG. 14 when SW1 is closed. U11 is a switching power supply that is configured as a buck booster. This allows for the battery-provided power source to drain to a very low voltage before giving out. The output of U11 is 6.3 volts(DC). This voltage is applied to transistor Q12 which is controlled by the microcontroller of FIG. 11. When Q12 is turned on through operation of Q13 by the microcontroller, the 6.3 volts(DC) is applied to regulator U9 of FIG. 14 where it is regulated to 5 volts(DC). The output from U9 energizes regulator U12 that provides an output of −5 volts(DC). These + and −5 volts(DC) voltages power the above-described audio section (FIG. 13) of the apparatus 28.

Advantages of the foregoing include low power consumption and low cost to manufacture. Regarding low power consumption, the specific unit of FIGS. 9–14 should last a minimum of at least fifteen working days on the batteries under "normal use," which is defined as intermittent operation with a duty cycle during which the apparatus is powered on for twenty minutes six times during an eight-hour shift, with power off intervals of forty-five minutes between use, and tracing tone to be applied six times after power up for a period not to exceed ten minutes for each duty cycle. The particular apparatus has lightning/high voltage protection; the specific unit should be able to withstand voltage spikes of 1000 volts(DC) for less than or equal to 500 microseconds between tip and ring, tip and ground, and ring and ground. The unit should be able to withstand voltage surges of 200 volts(DC) for less than or equal to 1 millisecond between tip and ring, tip and ground, and ring and ground.

The operation and method of the present invention are next described with reference to the environment of FIGS. 1 and 3 and the specific implementation of FIGS. 9–15.

When the telephone technician has his or her trouble ticket identifying the job, he or she goes to the cross-connect box 12. The technician lifts the jumper connection between the respective telephone line segments in the cable 2 and the cable 14. The technician tests the line back to the central office 8 with a suitable testing device (e.g., butt-set). If the line segment back to the central office tests OK (sounds clean, dials normally, and is free of noise), then the technician tests toward the subscriber using a suitable testing device (e.g., "PairChek" testing device). If a fault is detected, the technician usually drives to the next access point toward the subscriber; however, before doing so, the technician uses the apparatus 28.

Before leaving the cross-connect box 12, the technician takes the apparatus 28 and inserts it between the central office side pair and subscriber side pair where the jumper has been lifted. For example, the lifted jumper that still connects to the central office side is inserted into the spring loaded connectors implementing the tip terminal 48 and the ring terminal 50 in the specific implementation; this connects the central office tip wire segment and the central office ring wire segment to respective terminals of one connector of the apparatus 28 and thus to the switch 44. The tip and ring test leads implementing the terminals 52, 54 are connected to the respective pair of wires in the subscriber side cable 14; this connects the subscriber tip wire segment and the subscriber ring wire segment to the other connector of the specific implementation of the apparatus 28 and thus to the switch 44. The ground lead 56 is connected to the shield or ground of the cable 14. The apparatus 28 can be attached to the door of the cross-connect box using the magnet 70.

In the illustrated particular implementation of the apparatus 28, it is preferably turned on before being inserted into the telephone line. When turned on, the particular implementation resets itself to a passive, or sleep/listen, mode of operation in which the subscriber should not notice any change in performance of the line when the apparatus is inserted into the line. Before being turned on, the relays of the particular implementation are in the configuration in which they were when the apparatus was last turned off.

To turn on the apparatus of FIGS. 9–15, the technician presses the external "on/off" button of SW 1/65 (FIGS. 6 and 14). When this happens, the LED 69 (FIGS. 6 and 11) begins flashing at twenty interruptions per minute (ipm) (for example). The LED can be used to indicate other conditions (e.g., low battery or tracing tone on). Upon actuation of switch SW2/67 (FIGS. 6 and 11) or receipt of the appropriate control signal, the apparatus 28 applies tracing tone to the pair under test so that the technician can use a tone probe or butt-set at a subsequent test location to quickly locate the pair in a typical ready-access terminal having multiple telephone lines connected through it (when tracing tone is provided in the particular implementation, the LED 69 flashes at 120 ipm for three seconds, followed by one second off, then this cycle repeats while tracing tone is active).

When turned on, the apparatus 28 initially resets to the passive, or sleep/listen, mode of operation in which the subscriber should not notice any change in performance of the line. In this mode, the switch 44 bridges the central office side and the subscriber side. When the apparatus 28 is turned on and in the sleep/listen mode, it uses minimal power while awaiting receipt of one or more control signals. Upon receiving and decoding a control signal, the apparatus 28 enters its in-service mode of operation in which it powers up and services the control signal(s).

When the technician locates the respective pair at the next test location, the technician connects the testing device 38 to that pair and uses the touch-tone pad of the device to transmit DTMF control signals to the apparatus 28 over that same pair of wires. These are the wires under test (i.e., the wires connected to the terminals 52, 54 in this example) from the remote location to which the technician has moved. In the specific implementation, a transmitted control signal is encoded to begin with two consecutive star (**) dual-tone multi-frequency tones.

When the apparatus 28 receives a valid control signal (i.e., a control signal for which it is programmed to recognize), the apparatus 28 responds by sending a single DTMF acknowledgement signal. In the specific implementation, this includes generating a pound (#) tone via the DTMF decoder 58 under control of the programmed microcontroller 74 (other response tones can be used; and other responsiveness can be used, such as during programming of the apparatus).

In further response to decoding the control signal, the microcontroller 74 controls the switching components 72 to open the switch 44 between the central office tip terminal and the subscriber tip terminal and between the central office ring terminal and the subscriber ring terminal. If so instructed by the control signal, the circuit 74 also conforms the ends of the subscriber tip wire segment and the subscriber ring wire segment respectively connected to the subscriber tip terminal and the subscriber ring terminal to a test configuration determined in response to the control signal. In the specific implementation, this uses one of the test circuits 64a, 64b, 64c. After a predetermined time set for completing the selected test, the microcontroller 74 sends a test completed tone (a single star (*) tone in the specific implementation) over the tip and ring pair under test to the testing device 38 used by the technician at the remote location. The microcontroller 74 also controls the switching components 72 to close the switch 44 between the central office tip terminal and the subscriber tip terminal and between the central office ring terminal and the subscriber ring terminal in response to lapse of the predetermined time; in doing this, the apparatus 28 returns to the sleep/listen mode.

The foregoing is implemented by the programming illustrated in FIG. 15 for the specific implementation of FIGS. 9–14.

In the specific implementation, the control signals begin with two consecutive star (**) DTMF tones. Upon receiving the second star tone, the apparatus 28 opens the switch 44. This avoids misinterpretation by any equipment upstream of the apparatus 28 that might receive tones before the switch 44 is opened. This is imperative because equipment in the central office 8 (specifically the class 5 switching equipment 6 in the illustration of FIG. 1) responds to certain codes that can be sent by a subscriber. For example, CLASS Service Offerings include codes that permit speed dialing and call forwarding as well as other functions. These codes include formats such as a single star tone followed by two numeric tones and such as one or two numeric tones followed by a pound (#) tone. To prevent the class 5 switching equipment registers or other upstream equipment from receiving a control signal intended only for operating the apparatus 28, the unique double star tone is used.

In the specific implementation of the apparatus 28, the control signals further include two DTMF numeric tones after the leading two star tones. If the technician makes a mistake in entering a control signal, he or she can simply start over with "**" and the proper two numeric DTMF tones because the apparatus 28 stores only the last four tones received. Following are specific control signals used in the particular implementation of the apparatus 28 of FIGS. 9–14.

50: Toggle Tracing Tone on. Turn on warbling tracing tones. The tones are generated over a longitudinal type of physical connection. The warbling tones are defined as an oscillating set of tones. These tones are 577 Hz and 904 Hz. These tones are switched back and forth at approximately three times per second. This mode of operation will not time out for a considerable time as explained below. To cancel this function, any valid DTMF tone is transmitted onto the pair under test. Upon hearing any DTMF tone, the particular implementation of the apparatus 28 stops generating the tracing tones and reverts to the normal passive mode of operation or enters the in-service mode if so commanded. In some extremely poor line conditions, the DTMF tones can be very weak in amplitude because of high line resistance. To recognize DTMF tone commands through these poor conductive lines, the particular implementation of the apparatus 28** toggles off this function approximately every five seconds and listens for any DTMF tones for approximately one second through a normal metallic connection with central office battery. After listening for a DTMF tone, the apparatus reasserts the tracing tones back through a longitudinal connection. It continues this cycle until canceled by any single valid DTMF tone or until one hour has elapsed.

\*\*51: Normal mode of operation. Goes into a normal, passive mode of operation and enters a low power state.

\*\*52: Opens pair for sixty seconds. The apparatus opens the pair going to the subscriber side for fifteen seconds. This is to test for leakage, high resistance, short, and AC balance. The central office is reconnected to the subscriber side when the function times out.

\*\*53: Grounds subscriber tip for fifteen seconds. The apparatus opens the pair going to the subscriber side and grounds the subscriber tip for fifteen seconds. This is to test for tip resistance to ground. The ring wire is held open. The central office side is reconnected to the subscriber side when the function times out.

\*\*54: Grounds subscriber ring for fifteen seconds. The apparatus opens the pair going to the subscriber side and grounds the subscriber ring side for fifteen seconds. This is to test for ring resistance to ground. The tip wire is held open. The central office side is reconnected to the subscriber side when the function times out.

\*\*55: Shorts tip to ring. The apparatus opens the pair going to the subscriber side and internally connects the subscriber side tip and ring together for fifteen seconds. This is to test for loop resistance to the cross-connect box. The central office side is reconnected to the subscriber side when the function times out.

\*\*56: Provides quiet termination. The apparatus opens the pair going to the subscriber side and internally connects the subscriber side to a 600 ohm balanced quiet termination for fifteen seconds. This is to test for loop noise. The central office side is reconnected to the subscriber side when the function times out.

\*\*57: Places 1004 Hz differential tone @ 0 dBm for fifteen seconds. The apparatus opens the pair going to the subscriber side and internally connects the subscriber side to a 600 ohm balanced 1004 Hz differential tone @ 0 dBm for fifteen seconds. This can be used to measure two-wire insertion loss. The central office side is reconnected to the subscriber side when the function times out.

\*\*58: 10 Tone Sweep test, 404 to 3004 Hz. The apparatus opens the pair going to the subscriber side and internally connects the subscriber side to a 600 ohm balanced differential set of ten tones @ 0 dBm. This can be used to measure the two-wire insertion loss across the bandwidth of a typical subscriber channel. The central office side is reconnected to the subscriber side when the function times out.

\*\*59: 15 Tone Sweep test, 244 to 3674 Hz. The apparatus opens the pair going to the subscriber side and internally connects the subscriber side to a 600 ohm balanced differential set of fifteen tones @ 0 dBm. This can be used to measure two-wire insertion loss across the bandwidth of a typical subscriber channel. The central office side is reconnected to the subscriber side when the function times out.

\*\*98: Activate the apparatus. This command to the apparatus allows the unit to accept all other test commands. In the particular implementation, the apparatus does not respond to any other control signals until after receiving this code signal.

\*\*99: Deactivate the apparatus. This command to the apparatus keeps the unit from accepting any commands except control signal \*\*98. This is to preclude the unit from disconnecting the line in response to some inadvertent subscriber activity on the line. It is intended to be used by the technician after the repair has been completed.

Although the foregoing describes the particular operation and method of the specific implementation of FIGS. 9–14, the present invention can be more broadly defined. With regard to an environment such as illustrated in FIG. 3 in which the apparatus 28 and the testing device 38 are connected to the same telephone line, the method of the present invention can be defined as comprising: inserting a switch into a selected telephone line having a tip wire, divisible into a central office tip wire segment and a subscriber tip wire segment, and a ring wire, divisible into a central office ring wire segment and a subscriber ring wire segment, wherein inserting the switch includes: connecting the central office tip wire segment to a central office tip terminal of the switch, connecting the subscriber tip wire segment to a subscriber tip terminal of the switch, connecting the central office ring wire segment to a central office ring terminal of the switch, and connecting the subscriber ring wire segment to a subscriber ring terminal of the switch; transmitting, from a telephone technician's testing device connected to the subscriber tip wire segment and the subscriber ring wire segment at a location remote from the switch, at least one control signal over the subscriber tip wire segment and the subscriber ring wire segment to a circuit connected to the subscriber tip terminal and the subscriber ring terminal and to the switch; and transmitting, from a telephone technician's testing device connected to the subscriber tip wire segment and the subscriber ring wire segment at a location remote from the switch, at least one control signal over the subscriber tip wire segment and the subscriber ring wire segment to a circuit connected to the subscriber tip terminal and the subscriber ring terminal and to the switch. In a particular implementation such as described above, the at least one control signal can include a signal encoded to begin with two consecutive star (\*\*) dual-tone multi-frequency tones. The method also preferably further includes automatically closing the switch between the central office tip terminal and the subscriber tip terminal and between the central office ring terminal and the subscriber ring terminal in response to lapse of a predetermined time after the switch is opened in response to a control signal.

From the perspective of the apparatus 28 itself, the method can be defined as comprising connecting the telephone technician's remote assist apparatus into a single telephone line between a central office side and a subscriber side of the telephone line, wherein the telephone line is to be tested by a telephone technician located remote from the apparatus; receiving into the apparatus one or more control signals sent by the telephone technician over the telephone line; and open-circuiting the telephone line between the central office side and the subscriber side inside the apparatus in response to at least one control signal sent by the telephone technician over the telephone line. This can also include decoding control signals beginning with two consecutive star (**) dual-tone multi-frequency tones and/or automatically reconnecting the telephone line through the apparatus in response to lapse of a predetermined time after open-circuiting the telephone line.

With regard to the control signal encoding aspect of the present invention, the method can be defined as comprising: inserting a switch into a selected telephone line having a tip wire, divisible into a central office tip wire segment and a subscriber tip wire segment, and a ring wire, divisible into a central office ring wire segment and a subscriber ring wire segment, wherein inserting the switch includes: connecting the central office tip wire segment to a central office tip terminal of the switch, connecting the subscriber tip wire segment to a subscriber tip terminal of the switch, connecting the central office ring wire segment to a central office ring terminal of the switch, and connecting the subscriber ring wire segment to a subscriber ring terminal of the switch; transmitting at least one control signal, encoded to begin with two consecutive star (**) dual-tone multi-frequency tones, to a circuit connected to the switch; and operating the switch with the circuit in response to the at least one control signal. Operating the switch in response to at least one control signal includes opening the switch between the central office tip terminal and the subscriber tip terminal and between the central office ring terminal and the subscriber ring terminal. The method can further comprise automatically closing the switch between the central office tip terminal and the subscriber tip terminal and between the central office ring terminal and the subscriber ring terminal in response to lapse of a predetermined time after the switch has been opened. Although not required in this definition of the invention, the transmitting of the control signal(s) can include transmitting the control signal(s) over the same tip wire and the ring wire as is under test.

With regard to the automatic telephone line restoring feature of the present invention, the method can be defined as comprising: inserting a switch into a selected telephone line having a tip wire, divisible into a central office tip wire segment and a subscriber tip wire segment, and a ring wire, divisible into a central office ring wire segment and a subscriber ring wire segment, wherein inserting the switch includes: connecting the central office tip wire segment to a central office tip terminal of the switch, connecting the subscriber tip wire segment to a subscriber tip terminal of the switch, connecting the central office ring wire segment to a central office ring terminal of the switch, and connecting the subscriber ring wire segment to a subscriber ring terminal of the switch; receiving at least one control signal in a circuit connected to the switch; operating the switch with the circuit in response to the at least one control signal, wherein operating the switch in response to at least one control signal includes opening the switch between the central office tip terminal and the subscriber tip terminal and between the central office ring terminal and the subscriber ring terminal; and automatically closing the switch between the central office tip terminal and the subscriber tip terminal and between the central office ring terminal and the subscriber ring terminal in response to lapse of a predetermined time after said opening. In a particular implementation the at least one control signal can include a signal encoded to begin with two consecutive star (**) dual-tone multi-frequency tones. Although not required in this definition of the invention, the receiving can include receiving the at least one control signal over the tip wire and the ring wire under test.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A telephone technician's remote assist apparatus, comprising:

a central office side connector to connect to a pair of wires extending as a central office side of an identified telephone line extending between a central office and a subscriber and having a reported and known electrical fault;

a subscriber side connector to connect to a pair of wires extending as a subscriber side of the telephone line;

a switch connected to the central office side connector and to the subscriber side connector, wherein the switch is operable at least between (1) a state in which the central office side connector and the subscriber side connector are connected by the switch such that the pair of wires extending as the central office side of the telephone line is connected to the pair of wires extending as the subscriber side of the telephone line when each said pair is connected to the respective connector and (2) a state in which the central office side connector and the subscriber side connector are not connected by the switch such that the pair of wires extending as the central office side of the telephone line is disconnected from the pair of wires extending as the subscriber side of the telephone line when each said pair is connected to the respective connector; and a control circuit connected to at least one of the central office side connector and the subscriber side connector and to the switch such that the control circuit changes the switch from the first-mentioned state to the second-mentioned state for no more than an automatically limited time period such that the telephone line is open-circuited for no more than the limited time period in response to at least one non-subscriber generated control signal sent to the control circuit through the at least one connector to which the control circuit is connected.

2. An apparatus as defined in claim 1, wherein the control circuit includes a controller responsive to control signals encoded to begin with two consecutive star (**) dual-tone multi-frequency tones.

3. An apparatus as defined in claim 2, wherein the controller includes a timer in response to which the controller automatically changes the switch from the second-mentioned state to the first-mentioned state.

4. An apparatus as defined in claim 1, wherein the control circuit includes a controller having a timer in response to which the controller automatically changes the switch from the second-mentioned state to the first-mentioned state.

5. A telephone technician's remote assist apparatus, comprising:

means for connecting the apparatus into a single telephone line between a central office side and a subscriber side of the telephone line, wherein the telephone line is to be tested by a telephone technician outside a central office using a testing device connected to the telephone line at a location remote from the apparatus and the central office;

means for receiving in the apparatus, through the means for connecting, a plurality of control signals sent by the telephone technician over the telephone line; and means for open-circuiting the telephone line between the central office side and the subscriber side in response to at least one control signal sent by the telephone technician over the telephone line and received by the means for receiving.

6. An apparatus as defined in claim 5, wherein the means for open-circuiting the telephone line includes means for decoding the control signals encoded to begin with two consecutive star (**) dual-tone multi-frequency tones.

7. An apparatus as defined in claim 6, further comprising means for automatically reconnecting the telephone line through the apparatus in response to lapse of a predetermined time after open-circuiting the telephone line.

8. An apparatus as defined in claim 5, further comprising means for automatically reconnecting the telephone line through the apparatus in response to lapse of a predetermined time after open-circuiting the telephone line.

9. A telephone technician's remote assist apparatus for use by a telephone technician when the technician is testing a selected telephone line having a tip wire and a ring wire extending between a central office and a subscriber, wherein the tip wire includes at least one junction between a central office tip wire segment and a subscriber tip wire segment and wherein the ring wire includes at least one junction between a central office ring wire segment and a subscriber ring wire segment, the apparatus comprising:

a hand portable housing;

a first connector, the first connector connected to the housing such that the first connector connects to the central office tip wire segment and the central office ring wire segment when the apparatus is used;

a second connector, the second connector connected to the housing such that the second connector connects to the subscriber tip wire segment and the subscriber ring wire segment when the apparatus is used;

a switch disposed in the housing and connected to the first connector and the second connector such that the switch selectably (1) connects or disconnects the central office tip wire segment and the subscriber tip wire segment and (2) connects or disconnects the central office ring wire segment and the subscriber ring wire segment, when said wire segments are connected to their respective one of the first and second connectors;

a dual-tone multi-frequency tone detector disposed in the housing and connected to at least the second connector such that the detector receives dual-tone multi-frequency tones transmitted over the subscriber tip wire segment and the subscriber ring wire segment when connected to the second connector; and a switch control circuit disposed in the housing and connected to the dual-tone multi-frequency detector and the switch, wherein the switch control circuit is programmed to respond to at least one control signal encoded in dual-tone multi-frequency tones received by the detector and to operate the switch in response thereto to disconnect the central office tip wire segment from the subscriber tip wire segment and to disconnect the central office ring wire segment from the subscriber ring wire segment.

10. An apparatus as defined in claim 9, wherein the switch control circuit includes a timer that measures a predetermined time period relative to when the switch control circuit operates the switch to disconnect the central office tip wire segment from the subscriber tip wire segment and to disconnect the central office ring wire segment from the subscriber ring wire segment, and wherein the switch control circuit is further programmed to operate the switch to reconnect the central office tip wire segment to the subscriber tip wire segment and to reconnect the central office ring wire segment to the subscriber ring wire segment at the end of the predetermined time period.

11. An apparatus as defined in claim 9, wherein:

the apparatus further comprises at least one test circuit connected to the second connector; and the switch control circuit is connected to the at least one test circuit, and the switch control circuit is further programmed to operate at least one said test circuit in response to at least one detected control signal, whereby the at least one detected control signal initiates the switch control circuit operation of both the switch and the at least one test circuit.

12. An apparatus as defined in claim 11, wherein the switch control circuit automatically operates the switch to reconnect the central office tip wire segment to the subscriber tip wire segment and to reconnect the central office ring wire segment to the subscriber ring wire segment within a predetermined time period relative to operating at least one such test circuit.

13. An apparatus as defined in claim 12, wherein the switch control circuit is further programmed to respond to control signal encoding beginning with two consecutive star (**) dual-tone multi-frequency tones.

14. An apparatus as defined in claim 13, further comprising a magnet attached to the housing to mount the apparatus at a location where the apparatus is used.

15. An apparatus as defined in claim 9, wherein the switch control circuit is further programmed to respond to control signal encoding beginning with two consecutive star (**) dual-tone multi-frequency tones.

16. An apparatus as defined in claim 9, further comprising a magnet attached to the housing to mount the apparatus in a cross-connect box.

17. A telephone technician's remote assist apparatus, comprising:

a central office side connector to connect to a pair of wires extending as a central office side of a telephone line;

a subscriber side connector to connect to a pair of wires extending as a subscriber side of the telephone line;

a switch connected to the central office side connector and to the subscriber side connector, wherein the switch is operable at least between (1) a state in which the central office side connector and the subscriber side connector are connected by the switch such that the pair of wires extending as the central office side of the telephone line is connected to the pair of wires extending as the subscriber side of the telephone line when each said pair is connected to the respective connector and (2) a state in which the central office side connector and the subscriber side connector are not connected by the switch such that the pair of wires extending as the central office side of the telephone line is disconnected from the pair of wires extending as the subscriber side of the telephone line when each said pair is connected to the respective connector; and a control circuit connected to the switch such that the control circuit changes the switch from the first-mentioned state to the second-mentioned state in response to at least one control signal sent to the control circuit, wherein the control circuit includes a controller having a timer in response to which the controller automatically changes the switch from the second-mentioned state to the first-mentioned state after the control circuit has changed the switch to the second-mentioned state in response to at least one control signal.

18. A method of controlling a telephone line connection from a remote location, comprising:

inserting a switch into a selected telephone line having a tip wire, divisible into a central office tip wire segment and a subscriber tip wire segment, and a ring wire, divisible into a central office ring wire segment and a subscriber ring wire segment, wherein inserting the switch includes: connecting the central office tip wire segment to a central office tip terminal of the switch, connecting the subscriber tip wire segment to a subscriber tip terminal of the switch, connecting the central office ring wire segment to a central office ring terminal of the switch, and connecting the subscriber ring wire segment to a subscriber ring terminal of the switch;

transmitting, from a telephone technician's testing device connected to the subscriber tip wire segment and the subscriber ring wire segment at a location remote from the switch, at least one control signal over the subscriber tip wire segment and the subscriber ring wire segment to a circuit connected to the subscriber tip terminal and the subscriber ring terminal and to the switch; and operating the switch with the circuit in response to the at least one control signal.

19. A method as defined in claim 18, wherein the at least one control signal includes a signal encoded to begin with two consecutive star (**) dual-tone multi-frequency tones.

20. A method as defined in claim 19, wherein:

operating the switch in response to at least one control signal includes opening the switch between the central office tip terminal and the subscriber tip terminal and between the central office ring terminal and the subscriber ring terminal; and the method further comprises automatically closing the switch between the central office tip terminal and the subscriber tip terminal and between the central office ring terminal and the subscriber ring terminal in response to lapse of a predetermined time after said opening.

21. A method as defined in claim 18, wherein:

operating the switch in response to at least one control signal includes opening the switch between the central office tip terminal and the subscriber tip terminal and between the central office ring terminal and the subscriber ring terminal; and the method further comprises automatically closing the switch between the central office tip terminal and the subscriber tip terminal and between the central office ring terminal and the subscriber ring terminal in response to lapse of a predetermined time after said opening.

22. A method for use in testing a telephone line, comprising:

connecting a telephone technician's remote assist apparatus into a telephone line between a central office side and a subscriber side of the telephone line, wherein a fault-containing segment of the telephone line between the apparatus and a telephone technician located remote from the apparatus is to be tested by the telephone technician;

receiving into the apparatus one or more control signals sent from the remotely located telephone technician to the apparatus over the fault-containing segment of the telephone line; and open-circuiting the telephone line between the central office side and the subscriber side inside the apparatus in response to at least one received control signal.

23. A method as defined in claim 22, wherein open-circuiting the telephone line includes decoding control signals beginning with two consecutive star (**) dual-tone multi-frequency tones.

24. A method as defined in claim 23, further comprising automatically reconnecting the telephone line through the apparatus in response to lapse of a predetermined time after open-circuiting the telephone line.

25. A method as defined in claim 22, further comprising automatically reconnecting the telephone line through the apparatus in response to lapse of a predetermined time after open-circuiting the telephone line.

26. A method for use in testing a telephone line, comprising:

inserting a switch into a selected telephone line having a tip wire, divisible into a central office tip wire segment and a subscriber tip wire segment, and a ring wire, divisible into a central office ring wire segment and a subscriber ring wire segment, wherein inserting the switch includes: connecting the central office tip wire segment to a central office tip terminal of the switch, connecting the subscriber tip wire segment to a subscriber tip terminal of the switch, connecting the central office ring wire segment to a central office ring terminal of the switch, and connecting the subscriber ring wire segment to a subscriber ring terminal of the switch;

transmitting at least one control signal to a circuit connected to the switch, wherein the at least one control signal includes at least one signal which prevents a class 5 switching equipment register connected to the central office tip wire segment and the central office ring wire segment from receiving a control signal intended for operating the circuit; and operating the switch with the circuit in response to the at least one control signal.

27. A method as defined in claim 26, wherein:

operating the switch in response to at least one control signal includes opening the switch between the central office tip terminal and the subscriber tip terminal and between the central office ring terminal and the subscriber ring terminal; and the method further comprises automatically closing the switch between the central office tip terminal and the subscriber tip terminal and between the central office ring terminal and the subscriber ring terminal in response to lapse of a predetermined time after said opening.

28. A method as defined in claim 27, wherein transmitting includes transmitting at least one control signal over the tip wire and the ring wire.

29. A method as defined in claim 26, wherein transmitting includes transmitting at least one control signal over the tip wire and the ring wire.

30. A method for use in testing a telephone line, comprising:

inserting a switch into a selected telephone line having a tip wire, divisible into a central office tip wire segment and a subscriber tip wire segment, and a ring wire, divisible into a central office ring wire segment and a subscriber ring wire segment, wherein inserting the switch includes: connecting the central office tip wire segment to a central office tip terminal of the switch, connecting the subscriber tip wire segment to a subscriber tip terminal of the switch, connecting the central office ring wire segment to a central office ring terminal of the switch, and connecting the subscriber ring wire segment to a subscriber ring terminal of the switch;

receiving at least one control signal in a circuit connected to the switch;

operating the switch with the circuit in response to the at least one control signal, wherein operating the switch in response to at least one control signal includes opening the switch between the central office tip terminal and the subscriber tip terminal and between the central office ring terminal and the subscriber ring terminal; and automatically closing the switch between the central office tip terminal and the subscriber tip terminal and between the central office ring terminal and the subscriber ring terminal in response to lapse of a predetermined time after said opening.

31. A method as defined in claim 30, wherein the at least one control signal includes a signal encoded to begin with two consecutive star (**) dual-tone multi-frequency tones.

32. A method as defined in claim 31, wherein receiving includes receiving the at least one control signal over the tip wire and the ring wire.

33. A method as defined in claim 30, wherein receiving includes receiving the at least one control signal over the tip wire and the ring wire.

34. A method for use in testing a telephone line, comprising:

inserting a switch into a selected telephone line having a tip wire, divisible into a central office tip wire segment and a subscriber tip wire segment, and a ring wire, divisible into a central office ring wire segment and a subscriber ring wire segment, wherein inserting the switch includes: connecting the central office tip wire segment to a central office tip terminal of the switch, connecting the subscriber tip wire segment to a subscriber tip terminal of the switch, connecting the central office ring wire segment to a central office ring terminal of the switch, and connecting the subscriber ring wire segment to a subscriber ring terminal of the switch;

transmitting, from a location remote from the switch, a control signal encoded to begin with two consecutive star (**) dual-tone multi-frequency tones, wherein the transmitting occurs over the subscriber tip wire segment and the subscriber ring wire segment to a circuit connected to the subscriber tip terminal and the subscriber ring terminal and to the switch; and decoding the control signal in the circuit, and in response thereto, (1) opening the switch between the central office tip terminal and the subscriber tip terminal and between the central office ring terminal and the subscriber ring terminal, (2) conforming the ends of the subscriber tip wire segment and the subscriber ring wire segment respectively connected to the subscriber tip terminal and the subscriber ring terminal to a test configuration determined in response to the control signal, and (3) closing the switch between the central office tip terminal and the subscriber tip terminal and between the central office ring terminal and the subscriber ring terminal in response to lapse of a predetermined time responsive to the control signal.

35. Apparatus to provide automated remote assistance to a telephone technician testing a two-wire telephone line extending between a central office and a subscriber, the apparatus comprising:

a switch configured to connect in series into the two wires of the telephone line so that the subscriber is disconnected from the central office in response to opening the switch;

line configuration test circuitry configured to selectably connect to the two wires of the telephone line on the subscriber side of the switch; and a controller connected to the switch and the line configuration test circuitry and configured to connect to the two wires of the telephone line on the subscriber side of the switch, wherein the controller responds to control signals transmitted using the two wires of the telephone line to open and close the switch and to operate the line configuration test circuitry, and wherein the controller includes a timer that automatically causes the controller to close the switch at a predetermined time after the controller has opened the switch in response to a first transmitted control signal if the switch has not already been closed by the controller in response to a second transmitted control signal.

36. Apparatus as defined in claim 35, wherein the controller is programmed to respond to control signals encoded to prevent a switching equipment register connected to the telephone line in the central office from receiving subsequent control signals intended for the controller.

37. Apparatus as defined in claim 36, wherein the controller responds to control signals encoded to begin with two consecutive star (**) dual-tone multi-frequency tones.

38. An apparatus as defined in claim 1, wherein the control circuit includes a controller responsive to control signals encoded to prevent a class 5 switching equipment register in a central office connected to the central office side connector from receiving a control signal intended only for operating the controller.

39. An apparatus as defined in claim 5, wherein the means for open-circuiting is responsive to received control signals encoded to disconnect a class 5 switching equipment register in a central office connected to the telephone line.

40. An apparatus as defined in claim 9, wherein the switch control circuit is further programmed to respond to control signal encoding which prevents a class 5 switching equipment register from receiving control signals intended only for the switch control circuit.

41. A method as defined in claim 18, wherein the at least one control signal includes a control signal encoded to prevent a class 5 switching equipment register from receiving subsequent control signals.

42. A method as defined in claim 22, wherein open-circuiting the telephone line includes decoding control signals encoded to disconnect a class 5 switching equipment register in a central office connected to the telephone line.

43. A method as defined in claim 26, wherein the at least one signal is encoded to begin with two consecutive star (**) dual-tone multi-frequency tones.

44. A method as defined in claim 30, wherein the at least one control signal includes a signal encoded to prevent a class 5 switching equipment register from receiving subsequent control signals.

* * * * *